(12) United States Patent
Smith et al.

(10) Patent No.: US 12,355,811 B2
(45) Date of Patent: Jul. 8, 2025

(54) SYSTEM AND METHOD FOR SOCIAL NETWORK ANALYSIS

(71) Applicant: ZIGNAL LABS, INC., San Francisco, CA (US)

(72) Inventors: Alex Smith, Chadron, NE (US); Andras Benke, Bellevue, WA (US); Jonathan R Dodson, San Francisco, CA (US); Jeffrey Fenchel, San Francisco, CA (US); Loretta Jimenez, San Francisco, CA (US); Michael Kramer, San Francisco, CA (US); Fabien Vives, San Francisco, CA (US); Adam Beaugh, Kensington, CA (US); Felix Medina Wong, Fremont, CA (US); Melinda Chu, San Francisco, CA (US); Christopher Miller, San Francisco, CA (US); Ali Zafarani, San Francisco, CA (US)

(73) Assignee: ZIGNAL LABS, INC.

( * ) Notice: Subject to any disclaimer, the term of this patent is extended or adjusted under 35 U.S.C. 154(b) by 390 days.

(21) Appl. No.: 17/736,111

(22) Filed: May 4, 2022

(65) Prior Publication Data

US 2022/0360604 A1 Nov. 10, 2022

Related U.S. Application Data

(63) Continuation-in-part of application No. 16/452,640, filed on Jun. 26, 2019, now Pat. No. 11,356,476.
(Continued)

(51) Int. Cl.
*H04L 9/40* (2022.01)
*G06F 16/951* (2019.01)
*G06Q 50/00* (2012.01)

(52) U.S. Cl.
CPC ........ *H04L 63/1483* (2013.01); *G06F 16/951* (2019.01); *G06Q 50/01* (2013.01)

(58) Field of Classification Search
CPC ............ H04L 63/1466; H04L 63/1416; H04L 63/1425; H04L 2463/144; H04L 63/1458
(Continued)

(56) References Cited

U.S. PATENT DOCUMENTS

| 8,326,880 B2 | 12/2012 | Carson, Jr. |
| 8,464,346 B2 | 6/2013 | Barai |

(Continued)

FOREIGN PATENT DOCUMENTS

| CN | 101404658 | 4/2009 |
| CN | 101404658 B | 11/2011 |

(Continued)

OTHER PUBLICATIONS

He, Qi, et al. "Keep it simple with time: A reexamination of probabilistic topic detection models." IEEE Transactions on Pattern Analysis and Machine Intelligence 32.10: 1795-1808 (Year: 2010).
(Continued)

*Primary Examiner* — Badri Narayanan Champakesan
(74) *Attorney, Agent, or Firm* — GRAESER ASSOCIATES INTERNATIONAL INC; Dvorah Graeser

(57) ABSTRACT

A system and method for detecting interactive network of automated accounts, the interactive network of automated accounts comprising a plurality of automated accounts posting to a social media channel, the system comprising: an ingestion engine operated by a computational device for connecting to the social media channel and receiving a plurality of social media postings from a plurality of posting entities; a bot model operated by a computational device for determining whether at least one posting entity is a sus-
(Continued)

pected bot; and a computer network for communication between said computational devices.

20 Claims, 28 Drawing Sheets

Related U.S. Application Data

(60) Provisional application No. 62/689,889, filed on Jun. 26, 2018.

(58) Field of Classification Search
USPC .......................................................... 726/23
See application file for complete search history.

(56) References Cited

U.S. PATENT DOCUMENTS

| | | | | |
|---|---|---|---|---|
| 8,719,283 | B2* | 5/2014 | Koski | G06F 16/345 |
| | | | | 707/750 |
| 8,892,523 | B2* | 11/2014 | Amarendran | G06F 16/345 |
| | | | | 707/661 |
| 8,949,263 | B1 | 2/2015 | Rosner | |
| 8,955,129 | B2* | 2/2015 | Cao | H04L 63/1483 |
| | | | | 726/23 |
| 9,037,464 | B1 | 5/2015 | Mikolov | |
| 9,043,417 | B1* | 5/2015 | Jones | H04L 51/12 |
| | | | | 709/206 |
| 9,077,744 | B2* | 7/2015 | Beutel | H04L 63/1441 |
| 9,191,411 | B2* | 11/2015 | Foster | H04L 63/20 |
| 9,213,997 | B2* | 12/2015 | Chatterjee | G06Q 10/107 |
| 9,659,185 | B2* | 5/2017 | Elovici | G06Q 50/01 |
| 9,762,596 | B2 | 9/2017 | Wang | |
| 9,852,111 | B2 | 12/2017 | Dasgupta | |
| 9,886,501 | B2* | 2/2018 | Krishnamurthy ... | G06F 16/3329 |
| 11,003,703 | B1 | 5/2021 | Beaugh | |
| 11,356,476 | B2 | 6/2022 | Smith | |
| 11,640,420 | B2 | 5/2023 | Beaugh | |
| 2008/0307526 | A1* | 12/2008 | Chung | H04L 63/1416 |
| | | | | 726/23 |
| 2011/0134137 | A1 | 6/2011 | Lee | |
| 2012/0101965 | A1 | 4/2012 | Hennig | |
| 2013/0124556 | A1 | 5/2013 | Chowdhury | |
| 2013/0151525 | A1 | 6/2013 | Ankan | |
| 2013/0232263 | A1 | 9/2013 | Kelly | |
| 2013/0340089 | A1* | 12/2013 | Steinberg | G06Q 50/01 |
| | | | | 726/27 |
| 2014/0214840 | A1 | 7/2014 | Gupta | |
| 2014/0317736 | A1* | 10/2014 | Cao | H04L 67/22 |
| | | | | 726/23 |
| 2014/0358930 | A1* | 12/2014 | Lerman | G06F 16/353 |
| | | | | 707/740 |
| 2015/0154305 | A1 | 6/2015 | Lightner | |
| 2015/0188941 | A1* | 7/2015 | Boshmaf | H04L 63/1441 |
| | | | | 726/22 |
| 2015/0264068 | A1* | 9/2015 | Beauchesne | H04L 63/1416 |
| | | | | 726/23 |
| 2015/0310862 | A1 | 10/2015 | Dauphin | |
| 2015/0324707 | A1 | 11/2015 | Zhou | |
| 2015/0339477 | A1* | 11/2015 | Abrams | G06F 21/554 |
| | | | | 726/23 |
| 2016/0019324 | A1 | 1/2016 | Kanderian | |
| 2016/0042276 | A1 | 2/2016 | Lightner | |
| 2016/0162538 | A1 | 6/2016 | Basson | |
| 2018/0005131 | A1* | 1/2018 | Yin | G06N 7/005 |
| 2018/0046475 | A1* | 2/2018 | Wei | G06F 16/90324 |
| 2018/0089152 | A1 | 3/2018 | Maksak | |
| 2018/0114136 | A1 | 4/2018 | Kumar | |
| 2018/0176168 | A1 | 6/2018 | Tsou | |
| 2018/0232359 | A1 | 8/2018 | Crudele | |
| 2018/0293607 | A1* | 10/2018 | Huddleston | G06Q 50/01 |
| 2018/0322411 | A1 | 11/2018 | Wang | |
| 2018/0329985 | A1 | 11/2018 | Bao | |
| 2019/0014148 | A1* | 1/2019 | Foster | G06N 3/0445 |
| 2019/0026367 | A1 | 1/2019 | Boss | |
| 2019/0332694 | A1 | 10/2019 | Tcherechansky | |
| 2019/0332849 | A1* | 10/2019 | Gupta | G06N 3/084 |
| 2019/0370440 | A1 | 12/2019 | Gu | |
| 2019/0385062 | A1 | 12/2019 | Alcala | |
| 2019/0394231 | A1 | 12/2019 | Smith | |
| 2020/0012919 | A1 | 1/2020 | Bathaee | |
| 2020/0202071 | A1 | 6/2020 | Ghulati | |
| 2021/0256221 | A1 | 8/2021 | Beaugh | |
| 2023/0090601 | A1 | 3/2023 | Benke | |

FOREIGN PATENT DOCUMENTS

| | | | | |
|---|---|---|---|---|
| KR | | 101045331 B1 | 6/2011 | |
| WO | WO-2017027320 A1 * | | 2/2017 | ......... H04L 63/1425 |

OTHER PUBLICATIONS

Lau, Jey Han, Nigel Collier, and Timothy Baldwin. "On-line trend analysis with topic models:# twitter trends detection topic model online." Proceedings of COLING 2012. (Year: 2012) 16 pages.
Newman, David, et al. "Distributed algorithms for topic models." Journal of Machine Learning Research 10.8 (Year: 2009) 28 pages.
Office Action (Non-Final Rejection) dated Jan. 10, 2023 for U.S. Appl. No. 16/438,751 (pp. 1-34).
Office Action (Notice of Allowance and Fees Due (PTOL-85)) dated Feb. 10, 2023 for U.S. Appl. No. 17/224,224 (pp. 1-2).
Office Action (Notice of Allowance and Fees Due (PTOL-85)) dated Dec. 23, 2022 for U.S. Appl. No. 17/224,224 (pp. 1-11).
Yao, Limin, David Mimno, and Andrew McCallum. "Efficient methods for topic model inference on streaming document collections." Proceedings of the 15th ACM SIGKDD international conference on Knowledge discovery and data mining. (Year: 2009) 9 pages.
A. Conneau, D. Kiela, H. Schwenk, L. Barrault, A. Bordes, Supervised Learning of Universal Sentence Representations from Natural Language Inference Data, Proceedings of the 2017 Conference on Empirical Methods in Natural Language Processing; Sep. 2017, 11 pages.
Cer et al ("Universal Sentence Encoder", https://static.googleusercontent.com/media/research.google.com/en//pubs/archive/46808.pdf, published Mar. 29, 2018), 7 pages.
Gupta et al., "Detection and Characterization of Anomalous Entities in Social Communication Networks", 20th International Conference on Pattern Recognition, ICPR 2010, Istanbul, Turkey, Aug. 23-26, 2010, 738-741.
http://pyvandenbussche.info/2017/translating-embeddings-transe, by Pierre-Yves Vandenbussche, published Aug. 29, 2017, 8 pages.
https://medium.com/@gautam.karmakar/manhattan-lstm-model-for-text-similarity-2351f80d72f1 (published Mar. 31, 2018 by Gautam Karmakar, Medium.com), 7 pages.
https://nlp.stanford.edu/projects/glove/, by Pennington et al, first published in Aug. 2014, 3 pages.
https://wordnet.princeton.edu/, by Fellbaum, Christiane (first published in 2005), 4 pages.
Kevin, WebGL Lesson One: Getting Started, posted on Jun. 26, 2011 on https://www.learnopengles.com/ webgl-lesson-one-getting-started/, accessed on Oct. 24, 2020, 12 pages. (Year: 2011).
Mikolov et al ("Distributed Representations of Words and Phrases and their Compositionality"; Arxiv Oct. 16, 2013), 9 pages.
Mikolov et al ("Efficient Estimation of Word Representations in Vector Space"; Arxiv Sep. 7, 2013), 12 pages.
Notice of Allowance dated Dec. 31, 2020 for U.S. Appl. No. 16/580,098 (pp. 1-5).
Notice of Allowance dated Mar. 17, 2021 for U.S. Appl. No. 16/580,098 (pp. 1-5).
Office Action (Final Rejection) dated Jul. 25, 2022 for U.S. Appl. No. 17/224,224 (pp. 1-29).
Office Action (Non-Final Rejection) dated Oct. 21, 2021 for U.S. Appl. No. 17/224,224 (pp. 1-22).
Office Action (Notice of Allowance and Fees Due (PTOL-85)) dated Feb. 4, 2022 for U.S. Appl. No. 16/452,640 (pp. 1-13).

(56) References Cited

OTHER PUBLICATIONS

Office Action dated Jun. 28, 2021 for U.S. Appl. No. 16/452,640 (pp. 1-20).
Office Action dated Oct. 29, 2020 for U.S. Appl. No. 16/580,098 (pp. 1-27).
S. Kullback and R. A. Leibler ("On Information and Sufficiency", Ann. Math. Statist., vol. 22, No. 1 (1951), 79-86).
Z. Wu and M. Palmer ("Verb Semantics and Lexical Selection", Arxiv, Jun. 24, 1994), 7 pages.
Notice of Allowance dated Jul. 5, 2023 for U.S. Appl. No. 16/438,751 (pp. 1-9).
Office Action (Notice of Allowance and Fees Due (PTOL-85)) dated Jul. 5, 2023 for U.S. Appl. No. 16/438,751 (pp. 1-9).

\* cited by examiner

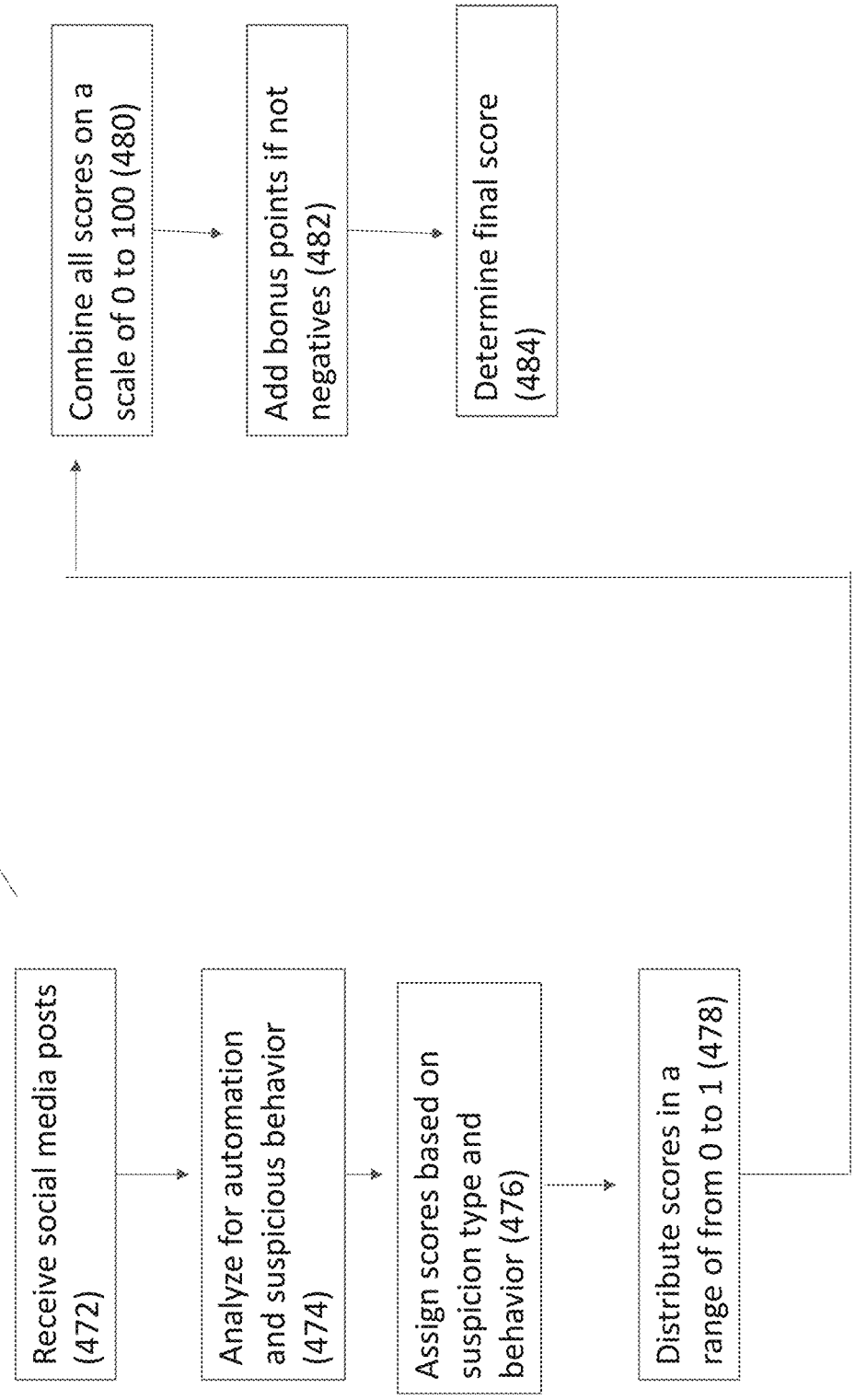

Figure 11

```
API Payload:
{
    activities: [{...some tweets}],
    allAuthors:[{...uniqueAuthors}],
    relationships:[{from:an_author_id...}],
    suspects:[author1,author2,author3,...],
    suspect2suspect:[author3,author4,...],
    humans:[author5,author6],
    usersFollowingSuspects:[author6,...],
    discoveredNetworkSuspects:[author7,...],
    postClusters:{
        hashtags: [
            {
                text:"#foobar",
                id:12345,
                allAuthors:[author1,author3,author6],
                suspects: [author1,author3],
                botComposition: 0.66
            },
            {...},
        ],
        retweeted_authors:[...],
        entities:[...],
        story_title:[...],
        story_domain:[...]
    }
}
```

SYSTEM AND METHOD FOR SOCIAL NETWORK ANALYSIS

FIELD OF THE INVENTION

The present invention, in at least some embodiments, is of a system and method for social network analysis, and in particular, to such a system and method for detecting networks of coordinated automatic posting entities.

BACKGROUND OF THE INVENTION

Automated posting entities to social media, or "bots", frequently operated in coordinated networks. This behavior is particularly characteristic of bots which attempt to pass themselves off as human posters, for example in an attempt to influence viewers of social media. In some cases, such behavior may even lead to attempts to influence stock prices and other illegitimate behavior.

Various solutions have been proposed to detect such bot networks, to expose potentially malicious or illegitimate behavior. For example, WO2017027320A1 describes a method to detect bots for social media postings. However, the method described is very general and would not necessarily correctly detect bots. Furthermore, the method would not be useful to detect bot networks, which are more dangerous in terms of their potential influence.

BRIEF SUMMARY OF THE INVENTION

The background art fails to provide a solution to the problem of detecting automated accounts posting to social media, and particularly fails to provide a solution to detect automated account networks.

The present invention overcomes these drawbacks of the background art by providing a system and method for detecting automated account networks that post to social media.

Optionally each method, flow or process as described herein may be described as being performed by a computational device which comprises a hardware processor configured to perform a predefined set of basic operations in response to receiving a corresponding basic instruction selected from a predefined native instruction set of codes, and memory. Each function described herein may therefore relate to executing a set of machine codes selected from the native instruction set for performing that function.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 4A-4K show exemplary processes for identifying further automated account candidates, based on followers of suspect automated accounts and optionally also those that the suspect automated accounts are following;

FIG. 11 shows a non-limiting, illustrative example of an API (application programming interface) for obtaining the social medial channel information, as part of a detector API service for supporting the detection of automated accounts;

DESCRIPTION OF AT LEAST SOME EMBODIMENTS

Figure 1:
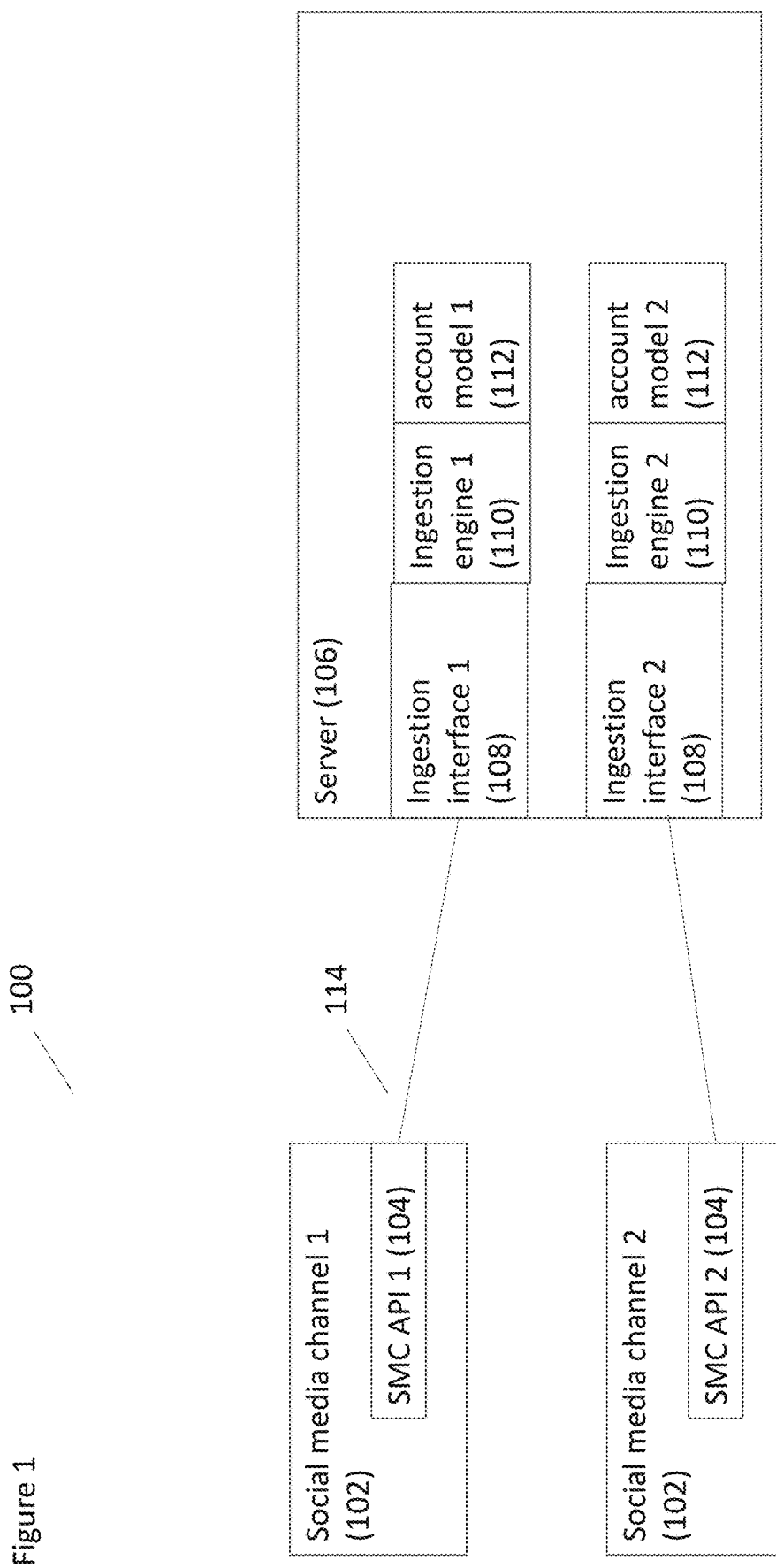
FIG. 1 shows a non-limiting, exemplary, illustrative system for detecting a plurality of automated accounts posting to social media channels.

Turning now to the drawings, FIG. 1 shows a non-limiting, exemplary, illustrative system for detecting a plurality of bots posting to social media channels. By "social media channel", it is meant a channel that permits a user to make a post thereto. Such a post may comprise text, image(s), video data, audio data or a combination thereof. Users may choose to receive posts from other users of the social media channel by "following" such one or more other users through the social media channel interface, according to the identity of such one or more other users as provided through the social media channel interface. Social media channels therefore naturally provide a network of communication between different users that follow, and/or are followed by, other users. The structure of such a network between such a plurality of users may be determined according to the flow of posts between them and/or may be explicitly provided by the social media channel.

A "bot" is an automated software which, in this example, is able to submit one or more posts to a social media channel. A bot is typically not identified as such; rather, the bot posts as though it were a human user of the social media channel. A bot can therefore be identified according to its behavior, which does not follow human social media channel posting patterns. The term "bot" is used interchangeably with an automated account or an automated user.

When a plurality of automated accounts act in concert, they are referred to as a "botnet". The description provided herein relates to detecting a plurality of automated accounts and also preferably includes determination of whether these automated accounts are networked together. The description may not relate to detection of whether the automated accounts are acting in concert. Automated accounts acting in concert have been used for nefarious purposes, such as to disparage a public company in an attempt to drive its stock price down, or to otherwise ruin the company's brand and reputation.

As shown, a system 100 features a plurality of social media channels 102, shown as social media channel 1 102 and social media channel 2 102 for the purpose of description only, and without any intention of being limiting. Each social media channel 102 comprises a corresponding SMC (social media channel) API (application programming interface) 104, shown as SMC API 1 104 and as SMC API 2 104, respectively. Each SMC API 104 supports accessing a plurality of postings to the respective social media channel 102, as well as identification of the entities making such postings (not shown). SMC API 104 also preferably provides access to a list of entities according to their networked relationship, as "followers" and/or as "followed".

A server 106 is able to communicate with SMC API 1 104 and SMC API 2 104 through a computer network 114, such as the internet for example. Server 106 operates a plurality of ingestion interfaces 108, each of which is able to receive data from a particular social media channel 102. Such interfaces 108 are shown as ingestion interface 1 108 and ingestion interface 2 108, for receiving such data from SMC API 1 104 and SMC API 2 104, respectively.

An ingestion engine 110 then receives a plurality of posts from a particular social media channel 102, as well the identity of the entity making each such post. Ingestion engine 110 also preferably receives the identity of the "followers" and "following" for each such entity. Ingestion engine 110 is shown as ingestion engine 1 110 and ingestion engine 2 110, communicating with ingestion interface 1 108 and ingestion interface 2 108, respectively. Ingestion engine 110 may optionally perform an initial analysis regarding the characterization of each entity, as a first pass to determine whether each such entity may be an automated account or a human.

The social media channel information is passed to an automated account model 112, shown as automated account model 1 112 and automated account model 2 112, communicating with ingestion engine 1 110 and ingestion engine 2 110, respectively. Automated account model 112 may optionally perform the entire analysis, regarding the characterization of each entity, to determine whether each such entity may be an automated account or a human. Alternatively automated account model 112 may perform further analysis after the first pass by ingestion engine 110.

The analysis preferably includes determining whether the entity falls into a likely automated account category based upon its posting and/or follower characteristics. This analysis, which is preferably an initial analysis, optionally features statistical measurements of entity posting behavior and follower numbers to determine whether an entity is likely to be an automated account.

As described in greater detail below, further analysis preferably includes determining the relationship between each suspect automated account entity and its followers. Followers of an automated account are more likely to be automated accounts themselves, although they may be human users as well.

Figure 2:
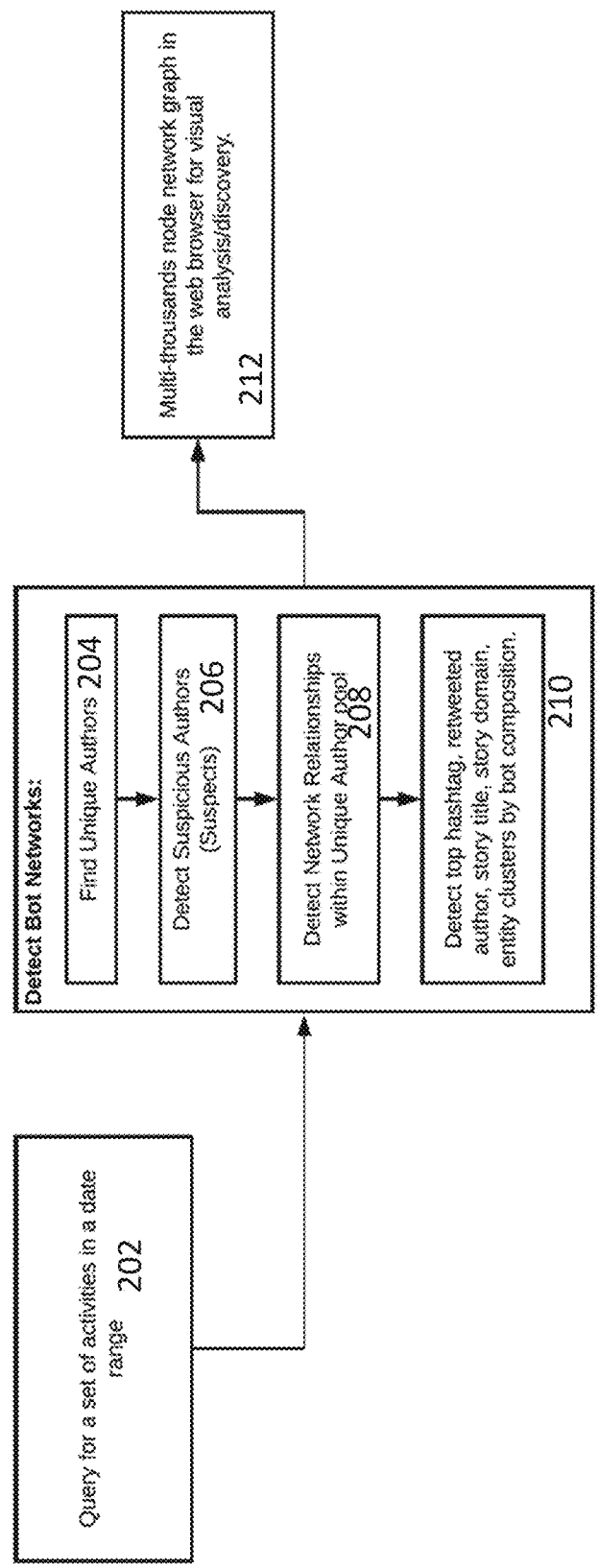
FIG. 2 shows a non-limiting exemplary process for detecting one or more automated accounts within a plurality of entities posting to social media channels.

FIG. 2 shows a non-limiting exemplary process for detecting one or more automated accounts within a plurality of entities posting to social media channels. As shown, a process 200 features sending a query for a plurality of activities, such as postings, preferably within a particular time frame, in 202. Next in 204 to 210, preferably a plurality of steps are performed to detect an automated account network, at 204, a plurality of unique authors of the social media posts are determined. This step is performed to remove any potential or actual duplicates, so that the unique authors with regard to the set of postings are detected.

In 206, suspicious entities or authors are detected, for example according to the first pass process described above. These suspicious entities may be automated accounts. In 208, network relationships within the unique author pool are determined. Optionally these relationships are determined for all authors but alternatively they are only determined for authors that are determined to be potentially suspicious.

In 210, optionally the activities performed by at least suspicious authors, but alternatively a plurality of authors or even all authors within the set of postings are analyzed. Such activities may include but are not limited to detecting the top hashtag, retweeted author, story title, story domain and entity clusters by automated account composition. This information is optionally used for static analysis, to determine the relationships between entities. For example, if one entity not only follows another suspicious entity but also amplifies that suspicious entity's postings, then this entity is more likely to be considered to be suspicious itself. For example, for the social media channel Twitter, retweeting (that is, reposting) a tweet from a suspicious entity may be used as an indication that the reposting entity is itself more likely to be an automated account.

Optionally, analysis of dynamic behavior of the entities may also be used to determine likelihood of a connected entity being a suspicious entity, and more likely to be an automated account. For example, if a follower entity of a suspected automated account entity rapidly reposts or otherwise amplifies the postings of the suspected automated account entity, that is an indication that the follower entity is also an automated account. Static analysis may be used without dynamic analysis, and vice versa.

Optionally these relationships and also optionally their activities are plotted in a visual manner in 212.

Figure 3A:
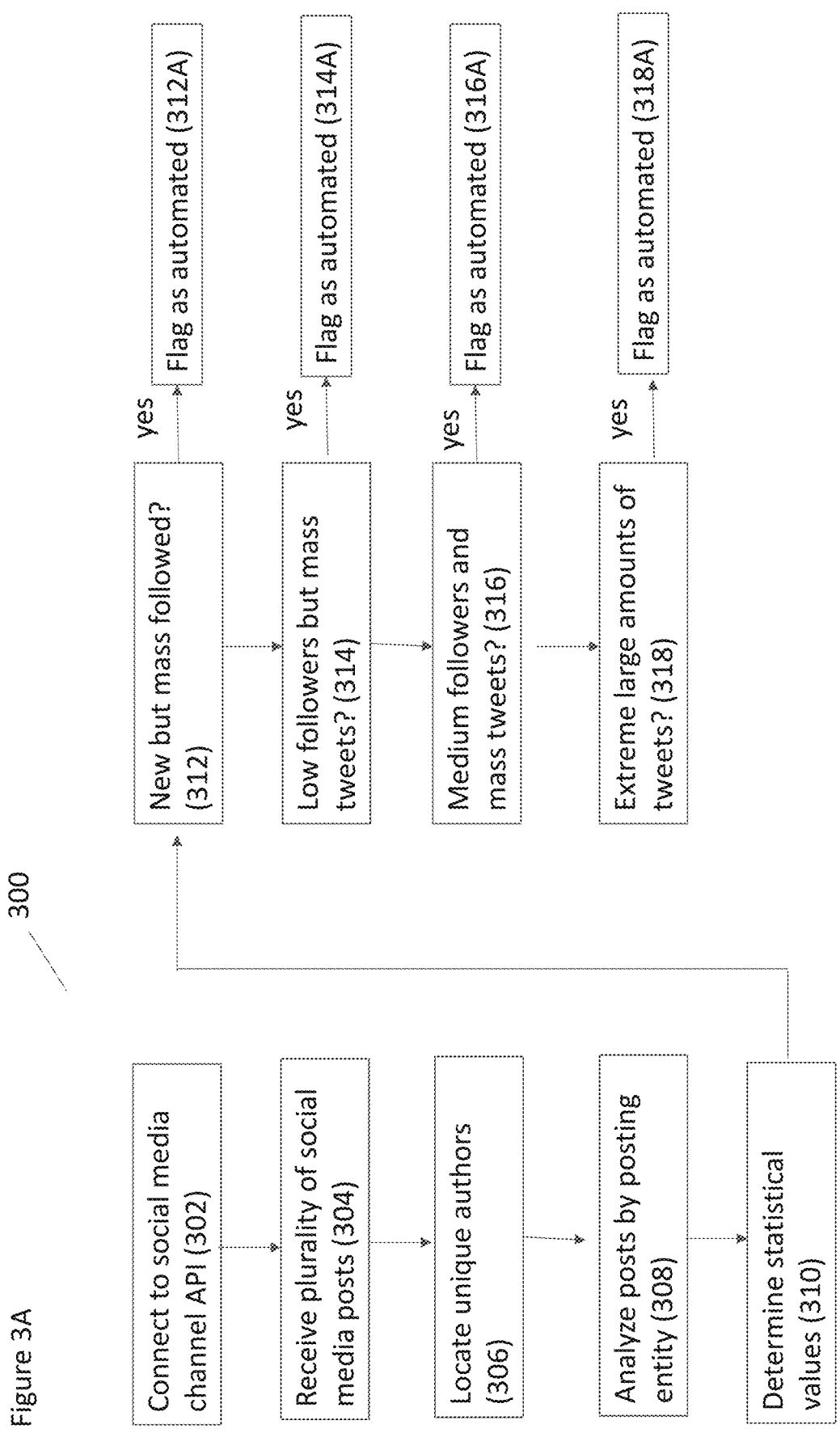
FIGS. 3A and 3B show two different non-limiting, exemplary processes for detecting one or more suspicious entities that may be automated accounts.
Figure 3B:
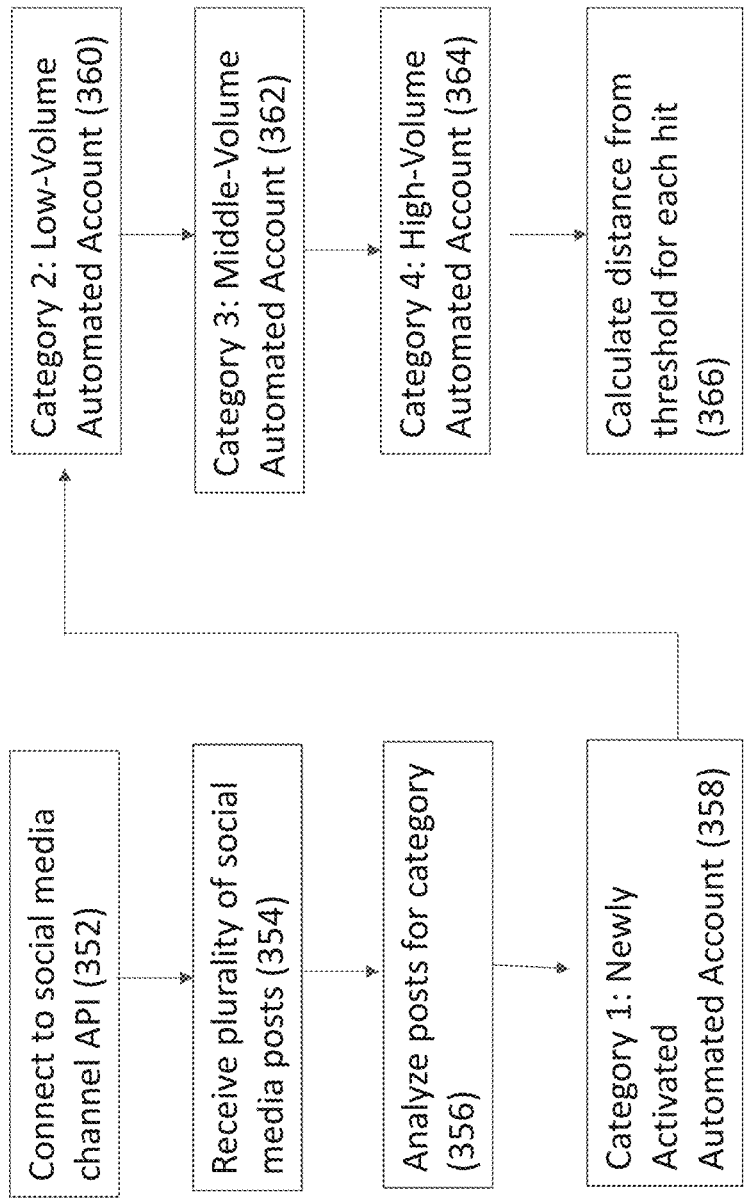

FIGS. 3A and 3B show two different non-limiting, exemplary processes for detecting one or more suspicious entities that may be automated accounts. Turning now to FIG. 3A, as shown, a process 300 begins with connecting to a social media channel API at 302 as previously described, in order to obtain a plurality of social media posts. In 304 the social media posts are received, for example by the previously described ingestion engine. The unique authors are identified in 306. The posts are then analyzed by posting entity in 308. Statistical values for the postings are then determined in 310, in particular with regard to the ratio of followers to tweets.

These values are then preferably passed through a series of filters in order to determine whether the posting entity is a suspect automated account. The filters may use one or more of the following calculations:

1. Ratio of the number of followers to the number of postings: foll_count/post_count.
2. Total number of postings: post_count
3. Sum of the number of followers and the number of postings: foll_count+post_count
4. Whether the number of followers is larger than the number of postings: post_count<foll_count
5. The absolute value of the number of followers minus the number of postings: foll_count−post_count Not all categorizations of an entity as suspicious may use all of these filters and/or may use different filters. Non-limiting examples of how a plurality of such filters may be applied include:

1. Brand New Mass Followed: A suspect in this category is filtered in 312. The behavior of such a suspect may for example include the following non-limiting categorization: a few thousand followers and 10 posts, such as 10 tweets for example; 3,000 followers, 49 posts; 1.2,000 followers, 11 posts; or 4,000 followers, 39 posts. This example is characterized by a significantly high ratio of followers to posts, which is not a typical pattern for a human user of social media. These followers may be other automated accounts and this entity may be part of a botnet. Preferably, the filters are applied as follows in this non-limiting example for Twitter. In this and the other examples provided herein, different filters and/or values of the values may be applied for different social media channels. Non-limiting examples of the filters that are applied and their values as applied may include:

A. foll_count/post_count is optionally from 1 to 500, preferably from 5 to 200 and more preferably from 6 to 100.

B. post_count is optionally less than 2000, preferably less than 1500, more preferably less than 1000 and most preferably less than 500.

C. foll_count+post_count is optionally from 500 to 25,000; preferably from 1000 to 20,000; more preferably from 1500 to 15,000; and most preferably from 2000 to 10,000.

D. post_count<foll_count is preferably true (that is, this condition is true for the entity).

Entities that fall within at least one and optionally all of these filters are preferably flagged as suspect automated accounts in 312A.

2. Newer Suspects: A suspect in this category is filtered in 314. The behavior of such a suspect may for example include the following non-limiting categorization: 5 followers, 2000 posts; 30 followers, 2,000 posts; 8 followers, 3,000 posts; 5 followers, 1500 posts; or 2 followers, 2,000 posts. This example is characterized by having a high ratio in the other direction, with a significant overbalance between posts and followers. Again, this is not a typical pattern for a human user of social media. Non-limiting examples of the filters that are applied and their values as applied may include:

A. foll_count/post_count is optionally less than or equal to 1, preferably less than or equal to 0.5, more preferably less than or equal to 0.1, and most preferably less than or equal to 0.05.

B. foll_count+post_count is optionally less than 10,000; preferably less than 7500; more preferably less than 5000; and most preferably less than 3000.

Entities that fall within at least one and optionally all of these filters are preferably flagged as suspect automated accounts in 314A.

3. Middle Age Suspects: A suspect in this category is filtered in 316. The behavior of such a suspect may for example include the following non-limiting categorization: 1800 followers, 30,000 posts; 500 followers, 10,000 posts; 700 followers, 20,000 posts; or 600 followers, 30,000 posts. This behavior still has many more posts than followers, with a ratio that is again overbalanced. Again, this is not a typical pattern for a human user of social media. Non-limiting examples of the filters that are applied and their values as applied may include:

A. foll_count/post_count is optionally less than or equal to 1, preferably less than or equal to 0.5, more preferably less than or equal to 0.1, and most preferably less than or equal to 0.05.

B. foll_count+post_count is optionally from 1000 to 75,000; preferably from 2500 to 60,000; more preferably from 5000 to 50,000; and most preferably from 10,000 to 40,000.

Entities that fall within at least one and optionally all of these filters are preferably flagged as suspect automated accounts in 316A.

4. Well Established Suspects: A suspect in this category is filtered in 318. The behavior of such a suspect may for example include the following non-limiting categorization: 2000 followers and 100,000+posts; 5700 followers, 500,000 posts; 400 followers, 45,000 posts; or 800 followers, 57,000 posts. This behavior may also be related to a very large number of postings such as a very large number of tweets for example. This example also has many more posts than followers, with a ratio that is again overbalanced. Again, this is not a typical pattern for a human user of social media. Non-limiting examples of the filters that are applied and their values as applied may include:

A. foll_count/post_count is optionally less than or equal to 1, preferably less than or equal to 0.5, more preferably less than or equal to 0.25, and most preferably less than or equal to 0.015.

B. The absolute value of foll_count−post_count is optionally greater than or equal to 50,000; preferably greater than or equal to 25,000; more preferably greater than or equal to 15,000; and most preferably greater than or equal to 10,000.

Entities that fall within at least one and optionally all of these filters are preferably flagged as suspect automated accounts in 318A.

An exemplary analysis was performed with all filters required to be applied with the above values set at their most preferable values in order for a suspicious entity to fall into one of the above categories. This analysis was demonstrated to identify up to 50% of the automated accounts in academic bot datasets (cresci-2017; https://botometer.iuni.iu.edu/bot-repository/datasets.html). In some categories (HR Spambots) up to 77% of automated accounts were identified.

Optionally, alternatively or additionally, a base score may be calculated in order to flag suspicious social media accounts. For example, the process of calculating such a score may start by calculating a ratio of followers: posts counts per the user to assign a base score that indicates whether an account has behavior that is suspicious, near suspicious, or not suspicious. This value is a base metric that may be augmented further down the processing pipeline with other modeling components.

FIG. 3B relates to a non-limiting, exemplary process for calculating such a base score. As shown, a process 350 begins with connecting to a social media channel API at 352 as previously described, in order to obtain a plurality of social media posts. In 354 the social media posts are received, for example by the previously described ingestion engine.

At 356, the social media posts are analyzed for category. Preferably each category is considered separately. Optionally once the social media account is determined to fulfill the criteria for a particular category, then the process does not continue for further categories. Preferably, even once the social media account is determined to fulfill the criteria for a particular category, the process continues to determine whether the criteria for a further category may be applicable.

As illustrated in each image below, the ratio of posts/followers (or of followers/posts, also used below in exemplary implementations) and volume of posts+followers determine if an account is suspicious. The thresholds per each volumetric group (category 1-4) are a cutoff point of too much activity for a particular volumetric growth phase of the account.

Over time the volume of post+followers (that is, posts plus followers), for a human user, is expected to grow organically to a reasonable plateau or at least to a reduced rate of growth. Automation may be predicted for accounts that reach a particular plateau, yet continue to post far too often. For such accounts, preferably additional tests are performed.

One such additional test is the determination of a distance. For each such category, more preferably the distance to the threshold is determined as shown. For example, the distance measurement may be used to see how much post volume they are generating versus how much volume a user in this category should normally have. The greater the distance to the threshold, the less likely that an account belongs to a particular category. As illustrated below, the thresholds are preferably cut-offs that sort accounts according to whether they are at the threshold or within a close negative distance.

The effect of distance may also depend upon the category being considered. As illustrated below, with four categories, category 1 accounts are considered to be clearly human. Optionally a more rigorous requirement is applied to determine whether an account fulfills the category 1 criteria. Also optionally additional requirements are applied.

In 358, the social media posts are analyzed in relation to category 1, which relates to a newly activated automated account. A non-limiting example relates to a social media account which has 9000 posts but only 11 followers.

In 360, the social media posts are analyzed in relation to category 2, which relates to a low volume automated account. A non-limiting example relates to a social media account which has about 50,000 posts, but only 500 followers.

In 362, the social media posts are analyzed in relation to category 3, which relates to a middle volume automated account. A non-limiting example relates to a social media account which has about 85,000 posts, but only 125 followers.

In 364, the social media posts are analyzed in relation to category 4, which relates to a high volume automated account. A non-limiting example relates to a social media account which has about 335,000 posts, but only 500 followers.

In 366 the distance from the threshold for each category that was a hit or that was applicable is preferably calculated.

For example, information that may be further considered for detecting an automated account within a processing pipeline includes but is not limited to the ratio of the number of followers to number of friends: foll_count/friends_count. In this non-limiting example, the number of followers relates to the number of other accounts that have chosen to follow this account. The number of friends relates to the number of accounts that this account has chosen to follow. Another non-limiting example of further information that may be used includes the identification of support application software used for posting. Non-limiting examples of such support application software include Twitter for iPhone, Zapier, TweetDeck, IFTTT (if this then that, an automation software service), Buffer and optionally others. Certain types of support application software are more likely to be used by an automated social media account, or bot, rather than a human operated social media account.

Figure 4A:
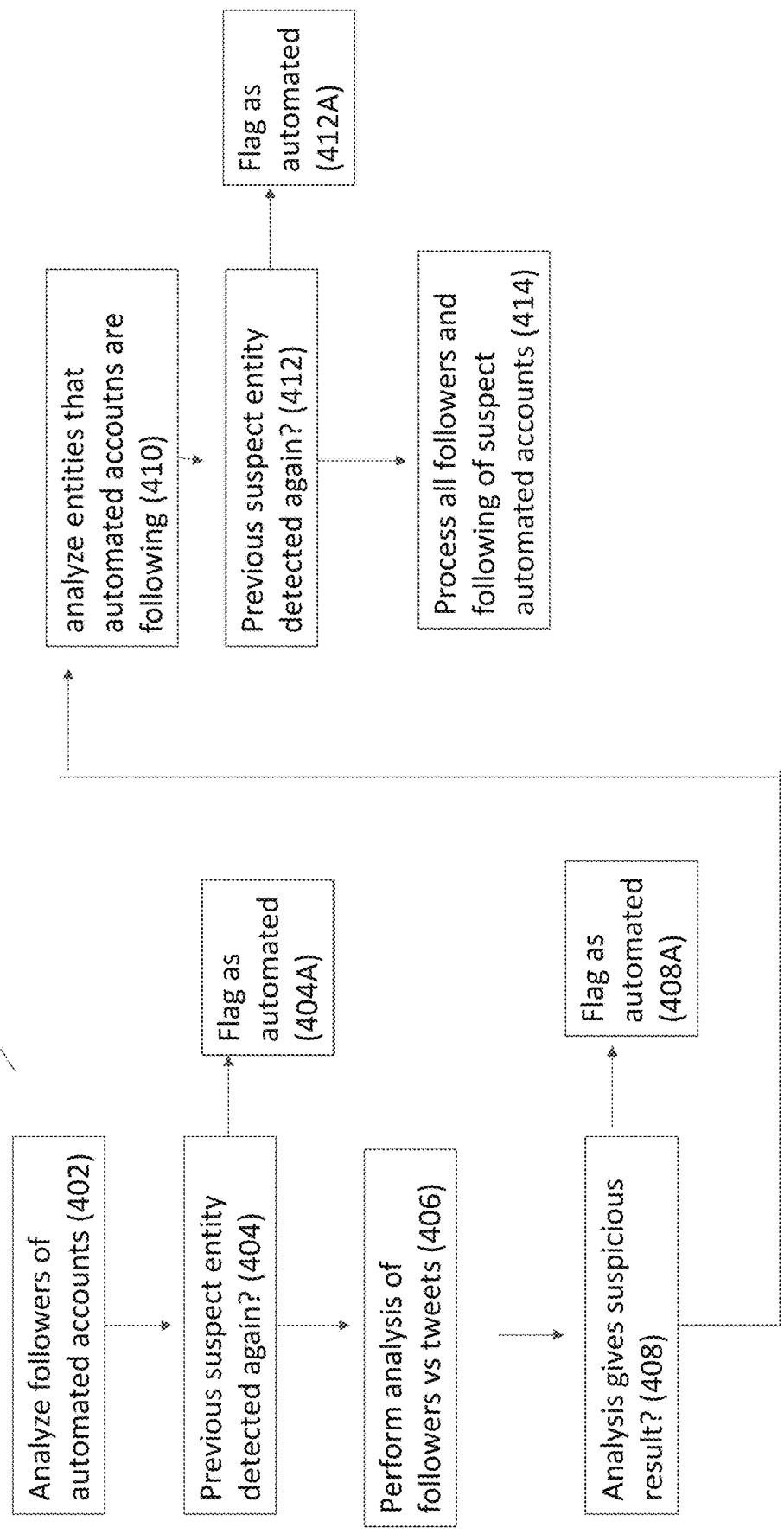
Figure 4B:
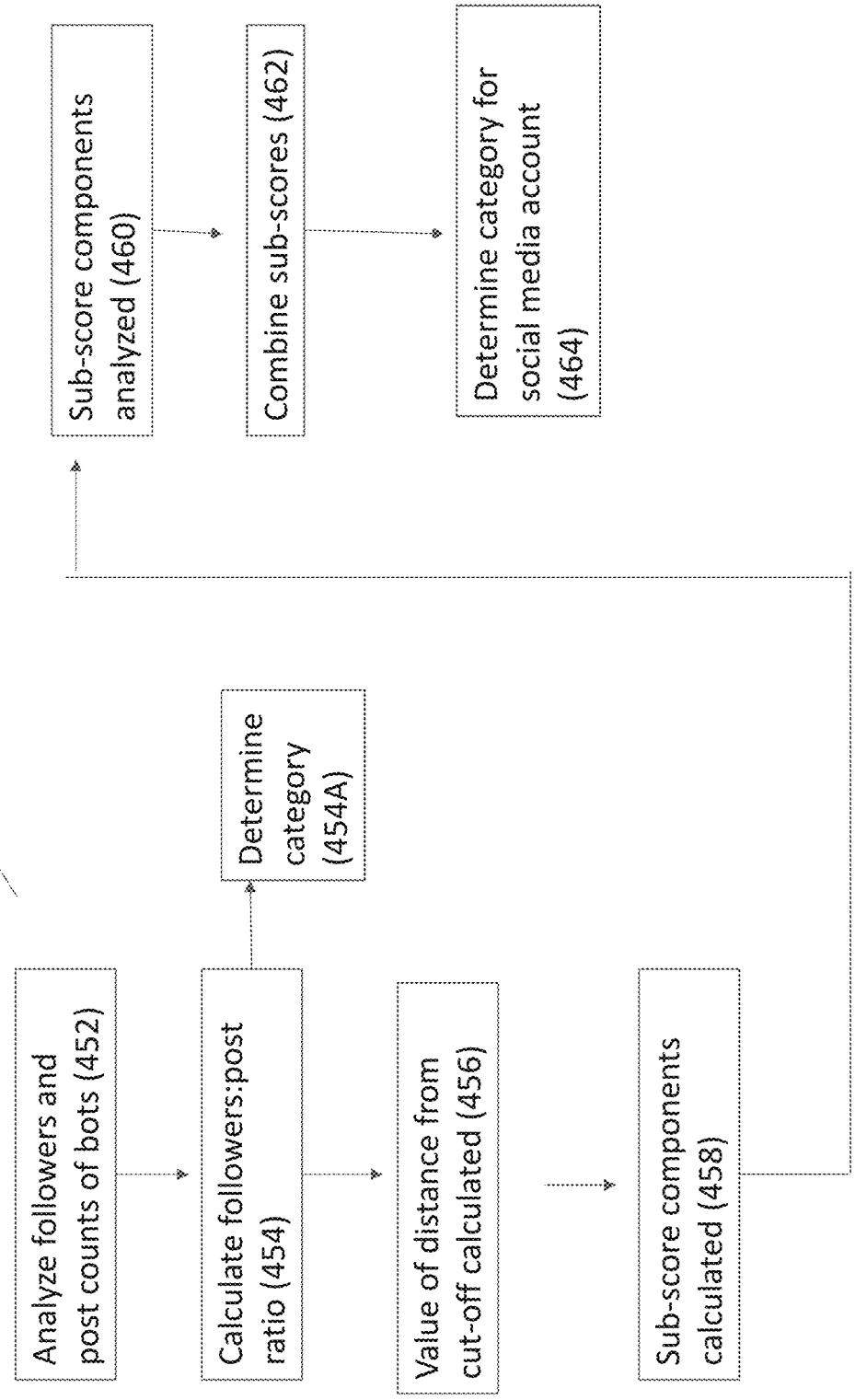

FIGS. 4A-4K show exemplary processes for identifying further automated account candidates, based on followers of suspect automated accounts and optionally also those that the suspect automated accounts are following. Such processes preferably analyze the network of connections between the suspect automated accounts and other entities. They may also optionally further analyze the behavior of the additional entities to determine whether they are suspect automated accounts. FIGS. 4A-4B and 4G relate to particular methods, while FIGS. 4C-4F and 4H-4K show non-limiting examples of accounts that fall within a category or that do not fall within a category.

Turning now to FIG. 4A, as shown in a process 400, followers of the suspect automated accounts are analyzed in 402. Optionally such followers are only analyzed if their postings are present in the batch of postings being analyzed. Such a requirement may be imposed to for example remove any inactive or less active entities, as one hallmark of an automated account entity is the tendency toward actively posting.

If a previous suspect entity is located again in 404, then it is preferably flagged as an automated account in 404A. Such an automated account may be particularly categorized as being connected to another automated account. In other words, such automated accounts are categorized as suspect automated accounts that are connected to other suspect automated accounts.

In 406, optionally a plurality of filters are applied to the suspect entities. As previously described, not all categorizations of an entity as suspicious may use all of these filters and/or may use different filters. These filters may be similar to those applied previously but with different values. Optionally these different values are more relaxed, or more likely to result in a suspect entity being determined to be an automated account, because following an automated account means that an entity is more likely to itself be an automated account. Non-limiting examples of the filters that are applied and their values as applied may include:

A. foll_count/post_count is optionally less than or equal to 0.5, preferably less than or equal to 0.25, more preferably less than or equal to 0.15, and most preferably less than or equal to 0.1; it may even be less than or equal to 0.08.

B. The absolute value of foll_count−post_count is optionally less than or equal to 100,000; preferably less than or equal to 250,000; more preferably less than or equal to 500,000; and most preferably less than or equal to 600,000.

In 408, it is determined if one or more, and preferably both, of the above filters turns out to be true for a suspicious entity. If so, then in 408A the suspicious entity is determined to be an automated account. Non-limiting examples of entities that match the above filters include 2500 followers, 40,000 posts; or 1900 followers, 173,000 posts.

An exemplary analysis was performed with all filters required to be applied with the above values set at their most preferable values in order for a suspicious entity to fall into one of the above categories. This analysis was demonstrated to identify up to 80% of the automated accounts in academic bot datasets (cresci-2017; https://botometer.iuni.iu.edu/bot-repository/datasets.html).

While entities that automated accounts follow may be considered less important for the above analysis, optionally they are included because automated accounts are typically part of an automated account network, with behavior that is controlled for the automated accounts as a group within the network. Optionally in 410, the entities that automated accounts follow are analyzed. If a previous suspect entity is detected again in 412, then such a suspect entity is determined to be an automated account in 412A. Optionally only suspect entities that were not previously flagged as definitely being automated accounts are considered.

In 414, the process is optionally performed again, to recursively examine at least automated account followers and also optionally the entities that are followed. The process may be performed repeatedly until no more entities are available for analysis.

FIG. 4B relates to a non-limiting, exemplary process or pipeline for calculating a base score, and then preferably further augmenting this calculation with additional processing. A process 450 begins by analyzing followers and post counts for a particular social media account, in 452. Next a base score is prepared in 454, by calculating a ratio of followers: posts counts per the user to assign a base score. The base score is then used to assign the user (social media account) to a particular category as suspicious, near suspicious, or not suspicious, in 454A. Next a value of the distance from the cutoff point of being suspected as an automated account (or "bot") is calculated in 456. As noted above, the distance is preferably used to determine how close an account is to a particular category. More preferably, an account is determined to fall within a category only if the distance is negative, and not positive.

In 458, the sub-score components are calculated. Non-limiting examples of the sub-score components are given below. In 460, the sub-score components are analyzed to determine whether they are more likely to indicate a human user who is posting through the social media account, or an automated account.

In 462, preferably the outputs of each sub-score component are combined to yield a single 'automation score', which is a score between 0:100 that indicates how automated (0) or human (100) an account is likely to be. For example:

A score of 0-33 would indicate heavy automation

A score of 44-55 seems slightly suspicious

A score of 65-100 indicates a human operated account. The higher the score, the more certainty there is that the social media account is a human account.

In 464, a category for the social media account as human, somewhat suspicious as being automated or very suspicious as being automated may be assigned.

Non-limiting examples of how to calculate exemplary sub-score components are given below.

Sub-Score Component 1: Intent

Intent is a metric that aims to measure perceived influence on Twitter. In a perfect world, to look influential a user may want to have an off-the-shelf influence score to resemble somebody famous or influential.

For instance: A celebrity might have a million plus followers, follow 100 users him or herself, and have a normal (not abnormally high) volume of a thousand to few thousand posts on their timeline.

Given that at least some users may try to boost fake influence, the Intent sub-component is used to programmatically assign a score of just how influential the user seems by the ratios and counts of their followers, friends, and posts.

Optionally intent has two parts. In a first part, it is determined whether the account has more followers than friends. If not, then the account is labeled as having low or no intent. Next, in a second part, the ratio of followers to friends is determined, and is then placed on a scale of from 0 to 1. For example, to achieve a score of 0.8 (or 80, if the scale is 1 to 100), then the account needs to have a ratio of followers to friends of at least 128. To achieve a score of 0.4, the ratio of followers to friends needs to be at least 2. Optionally the relationship between the ratio of followers to friends and the final score is adjusted according to the trends for such ratios across a plurality of accounts, as these numbers may change over time, according to the popularity of a particular type of social media for example.

Figure 4C:
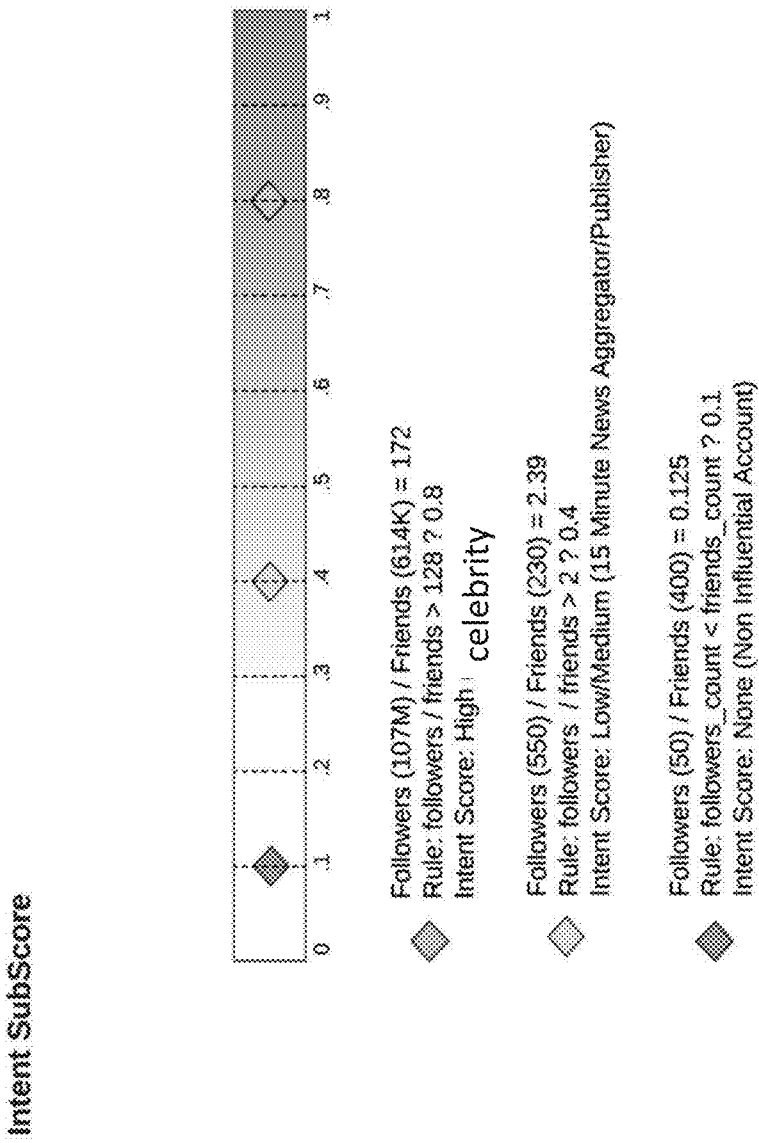

FIG. 4C shows a non-limiting example of a calculation of an intent score for a celebrity (blue diamond) in comparison to a news aggregator or publisher, that publishes news every 15 minutes (yellow diamond), and a non-influential account (orange diamond). As shown, the celebrity clearly has high intent, given the huge number of followers in comparison to the limited number of friends. However it is expected that other criteria for automation, such as spamminess, would not be fulfilled and so such an account would not be mislabeled. In addition, verified social media accounts may automatically be excluded from consideration of automation, even if they show high intent.

Sub-Score Component 2: Spamminess

Preferably the Spamminess sub-component is calculated after the influence sub-score. Spamminess will augment both the final score as well as the Automation Sub-Score component.

Spamminess may start by using the initial 'base score' value, the Intent sub-score, and the volume of posts to determine a spamminess score. Higher volume of posts would tend to increase the spamminess score, as would behavior that indicates a push to appear influential for intent. The original base score also indicates the extent to which a social media account may be operated by an automated account.

If a user has a higher spamminess score and a high intent to appear famous (fake famous), then a higher automation score is calculated in the final steps. That is, a worse (more automated) automation score is calculated if the user seems to be attempting to be too spammy and seem to be trying to look influential. A truly influential user would not engage in spammy behavior.

Conversely, a human account from a user who overposts, for example, will not get marked as an automated account or further augmented negatively because of examining one metric alone. A multi-component approach makes it easier to separate human vs automated behaviors.

As a non-limiting example, spamminess may be used to detect mid-level volume accounts that have higher than average post volumes than accounts should have at their growth phase (preferably determined by the number of followers). Optionally, a hard cut-off rule is also used, such that for example (Posts+Followers) in all cases must be >=50K and <=130K in order to receive any spamminess subscore. Optionally, only one side of the hard cut-off rule is used, for example, posts plus followers must be at least a certain amount, such as greater than or equal to 50,000. High volume spammers are preferably determined by Intent+base score.

Figure 4D:
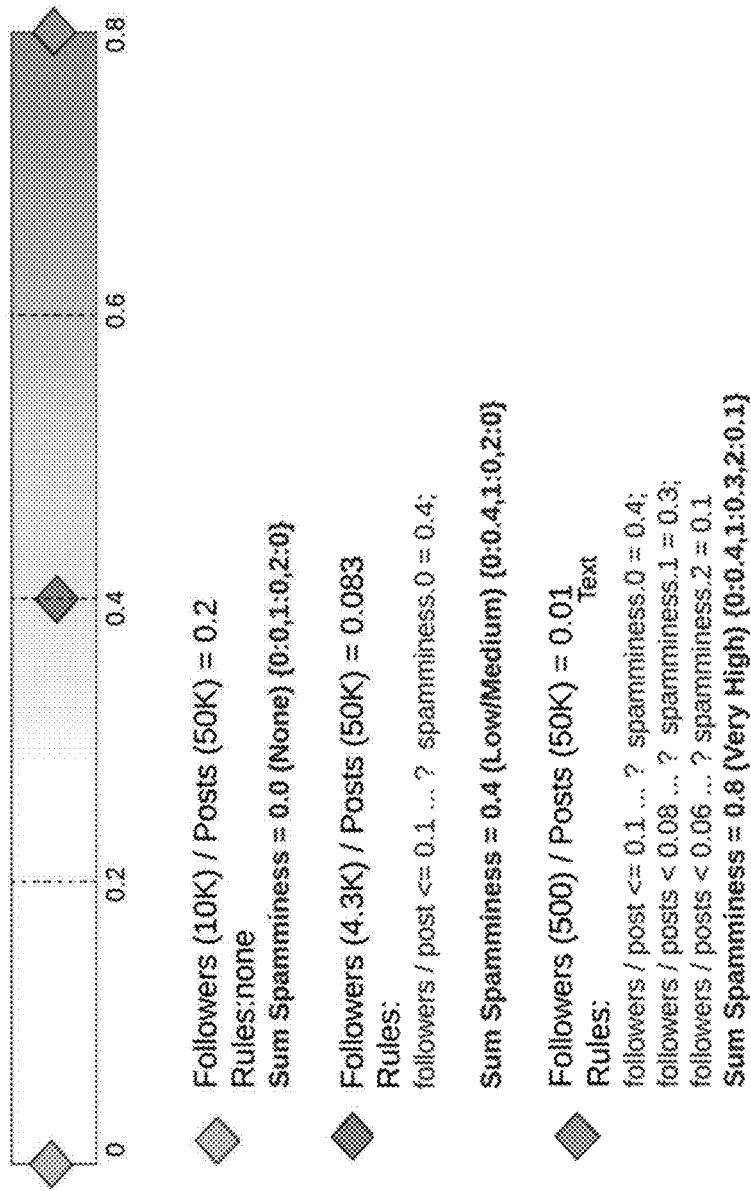

FIG. 4D shows a non-limiting example of calculating spamminess with the optionally minimum cutoff applied. All three accounts meet the cut-off rule. None of them are excluded from further consideration by meeting the above described intent threshold (calculations not shown). Three different scores are then applied and added up, assuming that the accounts meet the cut-off rule and are not excluded due to intent.

If followers_count/post_count is less than or equal to 0.1, a spamminess0 score of 0.4 is applied. If followers_count/post_count is less than or equal to 0.8, a spamminess1 score of 0.3 is applied. If followers_count/post_count is less than or equal to 0.06, a spamminess2 score of 0.1 is applied. All of these spamminess scores are then added up. The more criteria that an account falls into, the higher the spamminess score.

The blue diamond account has a spamminess score of 0 as the ratio of followers to posts is equal to 0.2, above all of the score cut-offs. The purple diamond has a spamminess score of 0.4, which is considered to be low to medium spamminess. The orange diamond has a high spamminess score of 0.8, the maximum score possible.

Sub-Score Component 3: Automated Behaviors

This component detects automated behavior signatures using the previous sub-score components. It may be used to augment the overall 'automation score' that is computed in the final step.

This step uses the 'base score' as initially calculated, the intent and spamminess sub-scores, the author post count, the followers and friends counts, and the author_application to determine an automated behavior sub-score between 0 and 1 as Light Automated, and above 1 to 2 as Heavily Automated. The author_application for example relates to various types of software that may be used to post to an account. Software that is more heavily associated with automation would increase the automated behavior subscore. Optionally the base score distance is used in addition to, or in place of, the base score. Also optionally a verification score is applied, as some types of social media have a mechanism to determine whether the entity posting (or at least owning the account) is a human being. Such verified accounts may be excluded from automation or alternatively may receive a lower automation behavior subscore as a result.

A score of 1 might have been assigned in the case an account has 300K posts, and a high intent+spamminess score, but is posting from 'Twitter for iPhone' application.

A score of 2 might have been assigned in the case an account has 300K posts, a high intent+spamminess score, and posted from 'Zapier.com' which is a known automation tool.

A low score of 0.5 might have been assigned if for example an account has 40K posts, a medium/low intent+spamminess score, but posted from 'TweetDeck' a known automated publishing tool.

Figure 4E:
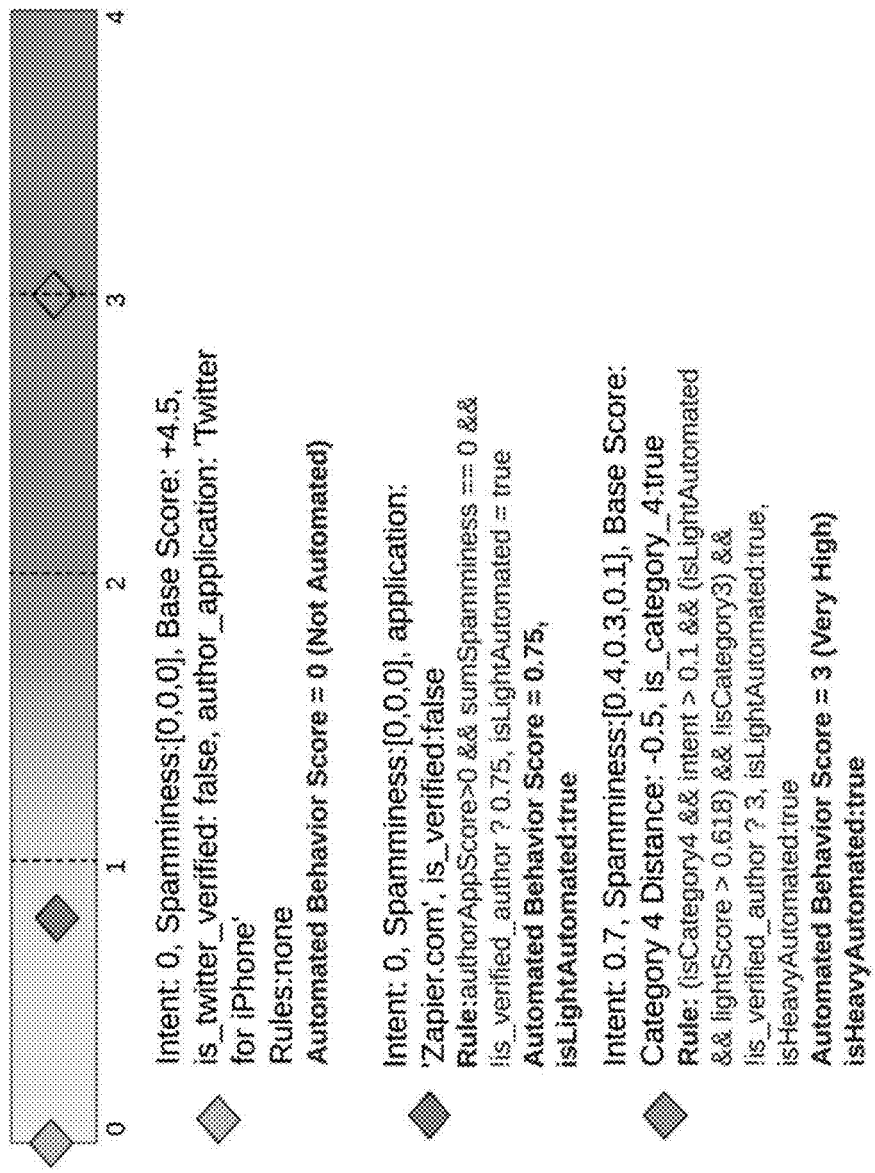

FIG. 4E relates to a non-limiting example of various accounts and their automated behavior score. As shown, the blue diamond fits into none of the rules for automated behaviors and so receives a 0 subscore. The purple diamond is an account that uses automation software to post to social media (Zapier), but fits none of the other criteria; it receives an automation behaviors subscore of 0.75, which is lightly automated. The orange diamond represents an account that has an automation behaviors subscore of 3, which is considered to be heavily automated. This account is very spammy and fits into category 4, which as described in greater detail below is very likely to be automated. Here high intent clearly does not relate to the behavior of an actual influencer.

Final Scoring Procedure

Preferably, 462 also includes applying each of the component sub-scores to augment the 'automation score base' into a final 'automation score' ranging from 0 to 100, where 0 is automated, 100 is human. The above scores are preferably included, for example including intent, base score (and/or base score distance), spamminess, automated behaviors, post count, follower count and social media verification (if available). The process starts by assuming all users are human. Any combination of negative sub-score qualities will impact the final score outcome. In the event a user has no seriously negative sub-score qualities, the process may optionally give bonus scores to ensure they get marked as human.

Figure 4F:
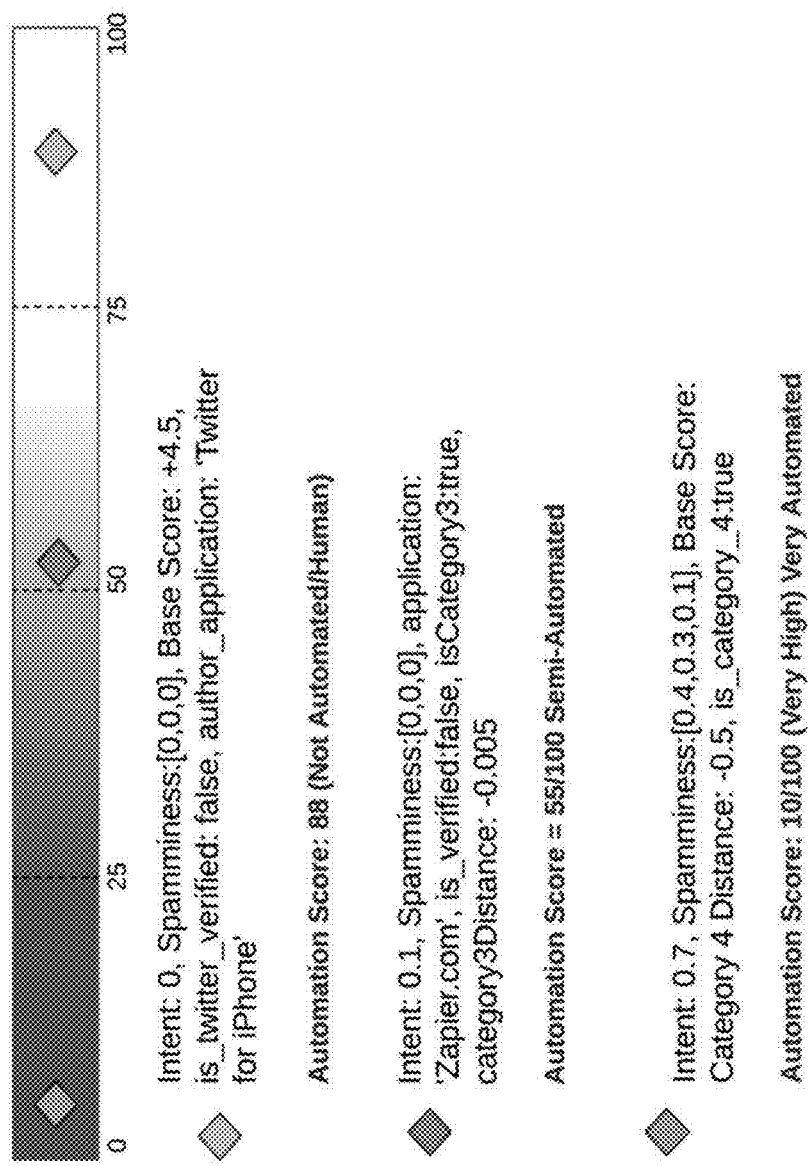

FIG. 4F relates to non-limiting examples of final scores. The blue diamond shows an account with a final score of 88, which is likely to be human operated. Factors as shown include low intent, low spamminess, being social media verified, not using automation to post and the base score. The purple diamond shows an account with a final score of 55, which is likely to be semi-automated. Factors as shown include low intent and spamminess, but also the use of automation to post and being definitively in category 3 (see below for more details regarding the categories). The orange diamond shows an account with a final score of 10, which is very likely to be automated. Factors as shown include high intent, high spamminess and being definitively in category 4.

FIG. 4G relates to another non-limiting exemplary process for calculating an overall score for automation. As shown in a process 470, the process begins by receiving a plurality of social media posts at 472. Next the posts are analyzed for automation and suspicious behavior at 474. In a second round, the posts are assigned scores based on suspicion type and automated behavior at 476. Then the scores resulting from 476 are distributed in a range of from 0 to 1 in a process at 478.

Additionally, preferably all scores are combined, including all sub-scores as described above, and distributed in a range of from 0 to 100 at 480. Optionally bonus points are given at 482 if the account has no negatives associated with it. At 484, a final score is given, with 0 being clearly automated and 100 being clearly human.

FIGS. 4H-4K relate in particular to non-limiting examples of category determinations. Preferably the categories are determined in the order shown, starting with category 1 (human operated account) and ending at category 4 (definitely automated or a "bot" account). In this preferred order, all accounts may start as being category 1, and then are eliminated from each subsequent category in order—so if they fail the criteria for category 1, they are considered for category 2; if they fail the criteria for category 2, they are considered for category 3; and if they fail the criteria for category 3, then they automatically fall into category 4. If for some reason they do not meet the criteria for category 4, the accounts may then be flagged for manual investigation.

Alternatively, the categories may be applied in reverse order (from category 4 to category 1). Also alternatively, all categories may be applied and only those that the account passes may be further considered.

The score for the threshold for separating categories preferably relates to the ratio of followers to posts (followers_count/post_count).

Figure 4H:
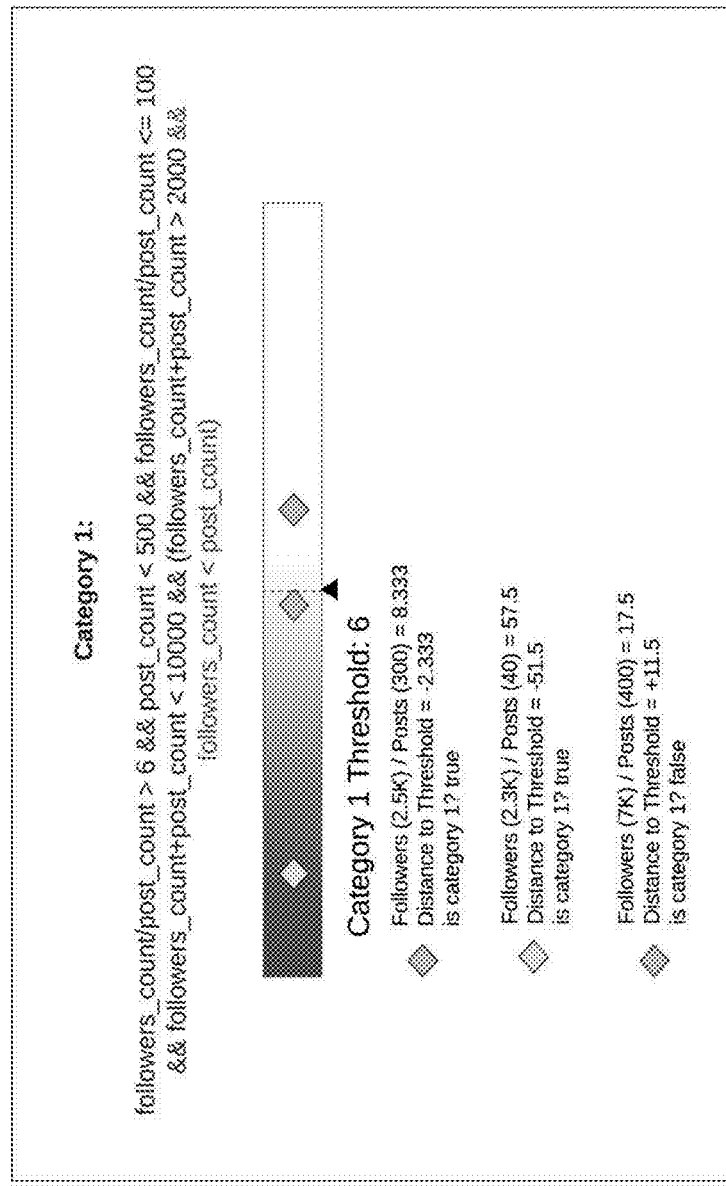

FIG. 4H shows the threshold for category 1, an account that is definitely operated by a human, as having a ratio of at least 6. To be included within this category, an account preferably has to fulfill certain additional rules. In this non-limiting example, such rules include at least one, but preferably all, of the following cut-offs: post_count<500, followers_count/post_count<=100, followers_count+post_count<10000, followers_count+post_count>2000, followers_count<post_count. For example, if an account is just getting started, it shouldn't have more followers than posts. This may indicate an account that is too low volume to have its behavior measured accurately. Of course, other cut-offs may be used in place of the above cut-offs.

More preferably, as previously described, a distance to the threshold is also calculated and that distance is used to determine whether the account belongs in a particular category. The distance is calculated by subtracting the ratio of followers to posts from the threshold. Most preferably, a negative distance is required, rather than a positive distance.

As shown in FIG. 4H, the blue and yellow diamonds both meet the threshold criteria with a negative distance. The green diamond has a positive distance and so does not meet the category 1 criteria.

Figure 4I:
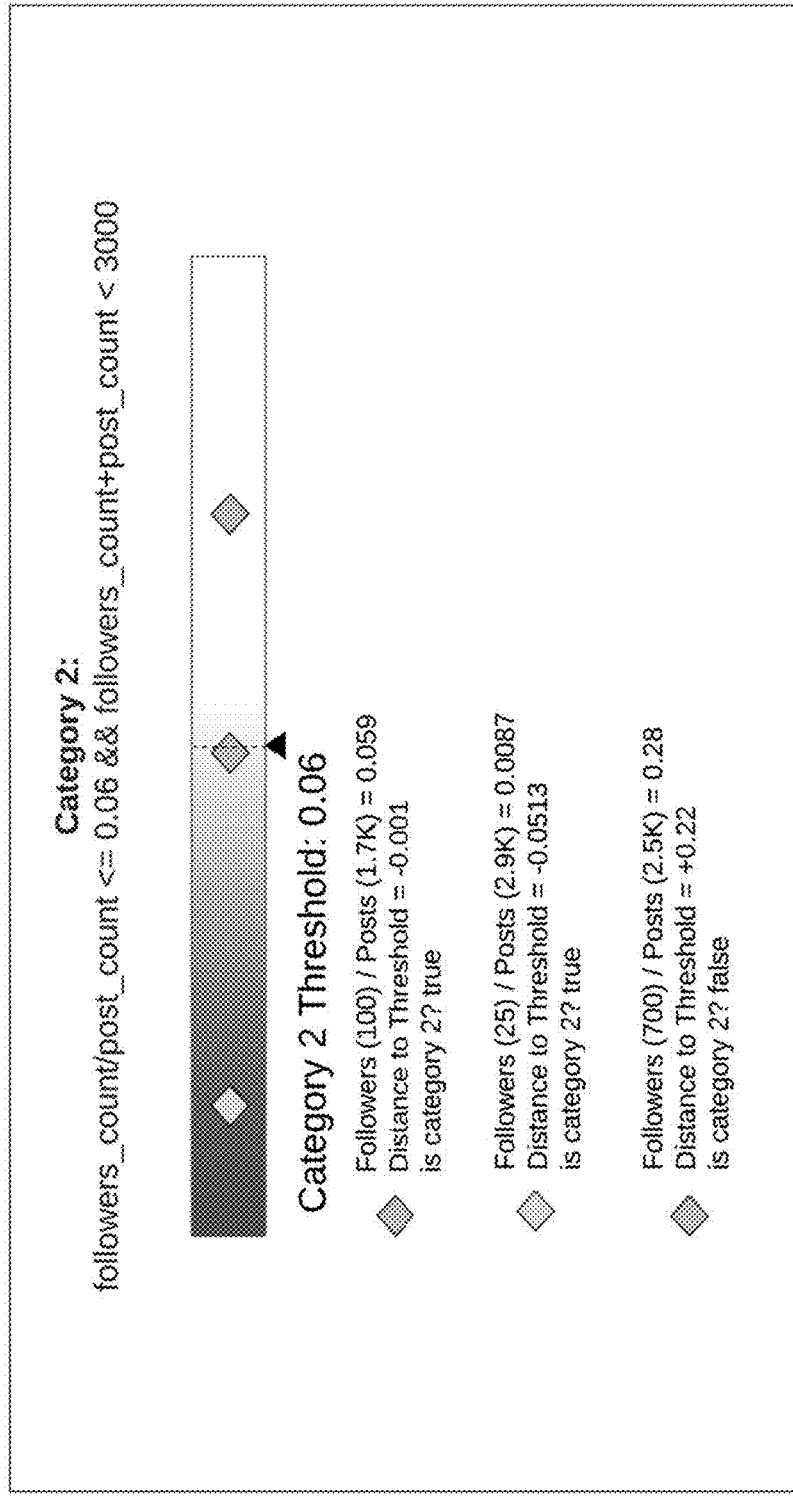

FIG. 4I relates to category 2 accounts. The threshold for the ratio of followers to posts is 0.06 in this non-limiting example, such that the ratio is at or below 0.06. These are accounts which are more likely to be at least semi-automated. Optionally a hard cut-off criteria is applied, such as for example followers_count+post_count<3000.

The blue diamond represents an account that is slightly below the threshold with a negative distance and so qualifies. Similarly, the yellow diamond represents an account that is below the threshold with a negative distance and so qualifies. However, the green diamond represents an account that is above the threshold with a positive distance, and so does not qualify.

Figure 4J:
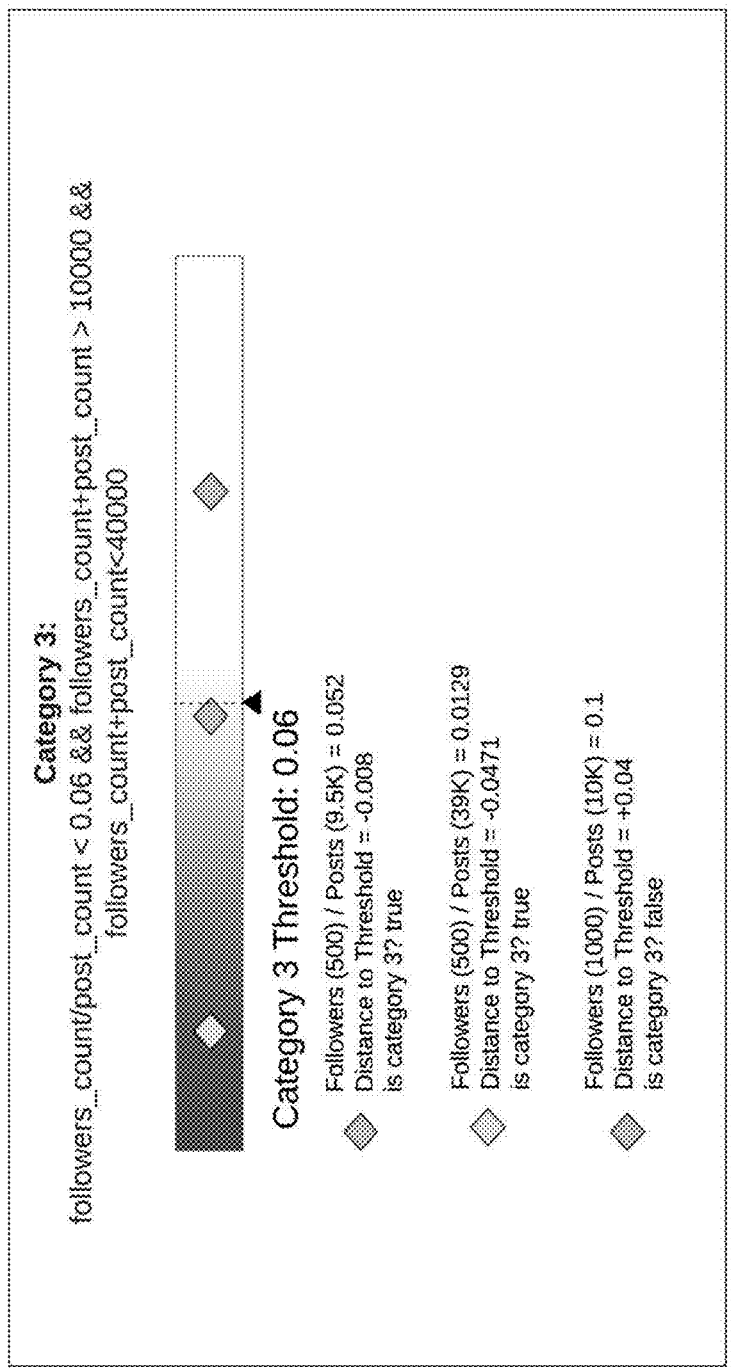

FIG. 4J relates to category 3 accounts, which are more automated than category 2 accounts. The threshold for the ratio of followers to posts is 0.06 in this non-limiting example, such that the ratio is at or below 0.06. This ratio is optionally the same as for category 2, but additional criteria are applied to distinguish the categories. The ratio may also be different (for example, 0.6 for category 2 and 0.06 for category 3).

For this non-limiting example, the additional hard cut-off criteria include followers_count+post_count>10000 and followers_count+post_count<40000, so that a range for the total number of followers and posts is preferably from (or above) 10,000 (10K) to (or below) 40,000 (40K). Again accounts represented by the blue and yellow diamonds have a ratio below 0.06, with a negative distance to the threshold, and so meet the criteria for category 3. An account represented by the green diamond has a score above the threshold, with a positive distance, and so does not meet the criteria.

Figure 4K:
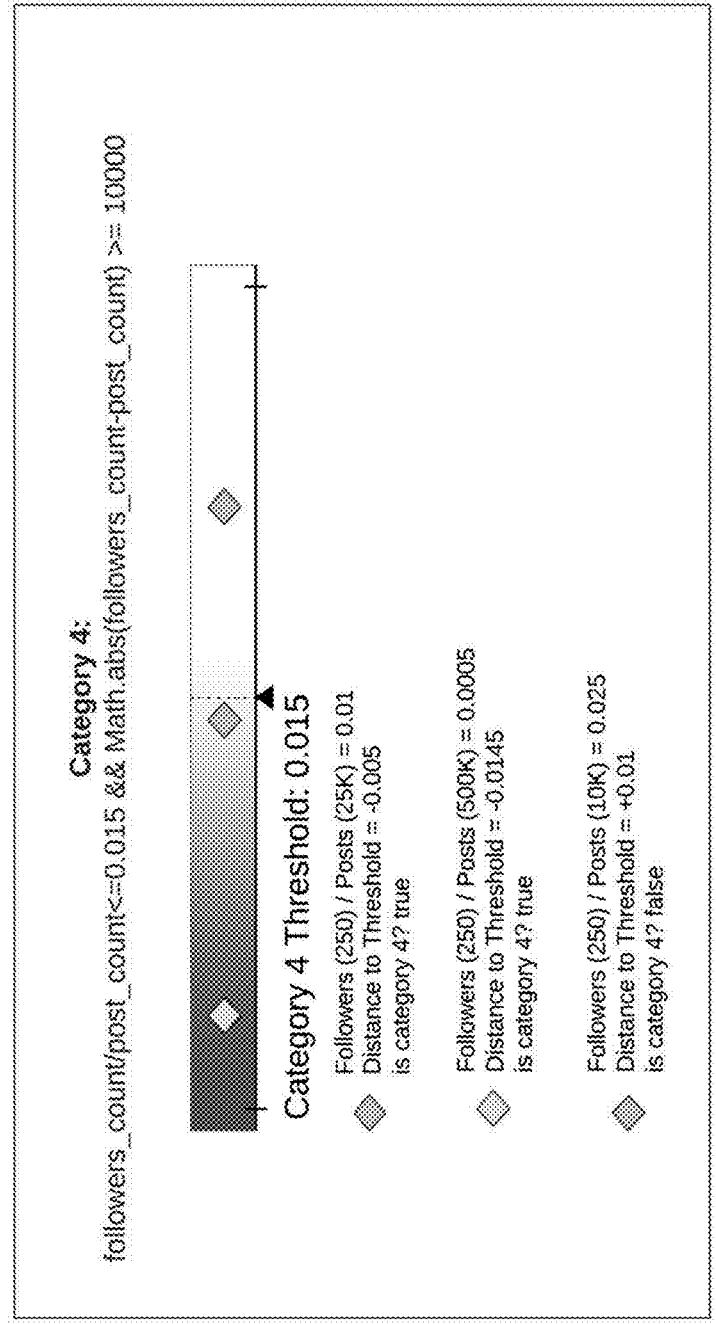

FIG. 4K relates to category 4 accounts, which are heavily automated. The ratio of followers to posts is at or below 0.015 in this non-limiting example. An additional hard cut-off which may be applied is that the absolute value of followers_count-post_count is 10,000 or more (at least 10K). That is, there preferably needs to be a very large imbalance between posts and followers.

Accounts represented by the blue and yellow diamonds fit both the cut-off criteria and have a ratio that is a negative distance from the threshold. The account represented by the green diamond has a score above the threshold, with a positive distance, and so does not meet the criteria. It also does not meet the absolute cut-off criteria.

Non-limiting Scoring Examples are now provided. These Examples include such information as the category determination from FIG. 3B and FIG. 4G, and the sub-scores described above.

00:33: Highly automated accounts, bot networks, high volume bot posters, iPhone bot factories, high-volume spammers Example User 1: Friends: 179, Followers: 55, Posts: 150K, Application: Twitter for iPhone Suspicious Base Score: Category 4 is true (high/spammy volume posting behaviors), distance from edge of category 4 threshold: −0.01463919994 (a larger margin but still salvageable in the case this was a frequently posting human, given that although the distance is negative—and hence fits within the category—it is a very small number, indicating that the account is right at the threshold).

Intent Sub-Score: 0.3 (possibly trying to blend in as a mid-level influencer)

Spamminess Sub-Score: 0 (already spammy by default for category 4. This one is not subtle which is what spamminess sub-score is trying to find)

Automation Sub-Score: 2.0 (Highly Automated). Despite posting from an iPhone in the sample case, behaviors for iPhone users do not fit the model of volumes in category 4 plus some Intent to appear influential.

Final Score: 0 (heavily automated account)

Example User 2: Friends: 196, Followers: 18, Posts: 40K, Application: IFTTT (if this then that, an automation service)

Suspicious Base Score: Category 3 is true (mid-level spammer/middle-aged account) distance from edge of category 3 threshold: −0.059524576741237685, Category 4 is true (high/spammy volume posting behaviors), distance from edge of category 4 threshold: −0.014524576741237685.

Intent Sub-Score: 0.1 (not trying to look influential)

Spamminess Sub-Score: 0.7 (Level 0: 0.4, Level 1: 0.3)— Seems subtle spammy or clever Automation Sub-Score: 0.75 (Light Automated). The combination of IFTTT and medium post volume yield a light-automation score.

Final Score: 28. Still on the spammy/automated side, but not a 0 which is heavily automated.

33:46: Automated relevant accounts (15 minute tech news), marketers, low/medium volume fake influencers, medium/targeted spam outlets Example User 1: Friends: 1100, Followers: 300, Posts: 40K, Application: Twitter for Android Suspicious Base Score: Category 4 is true, however barely over the line with distance from the threshold being: −0.006859752359936251, meaning that this account may be human. The other scores are preferably used to determine such accounts as being human or automated to some degree.

Intent Sub-Score: 0.1 (not trying to look influential)

Spamminess Sub-Score: 0.7 (Level 0: 0.4, Level 1: 0.3)—Seems subtle spammy or clever Automation Sub-Score: 0.7 (Light Automated). Despite using a legitimate application (Twitter for Android), this user model posts too high volume to a small audience.

Final Score: 40. May use some automation tools to augment post volumes.

Example User 2: Friends: 700, Followers: 800, Posts: 65K, Application: 15 Minute News Technology Suspicious Base Score: Category 4 is true, however barely above the threshold.

Intent Sub-Score: 0.1 (not trying to look influential)

Spamminess Sub-Score: 0

Automation Sub-score: 0 (not automated)

Final Score: 46. Despite being a 15 minute news site, this particular curated news feed has some interactive following and cleans their timeline. In contrast, a spammy automated outlet could post even as often every 15 minutes for a decade, without removing no longer relevant social media posts.

46-55: Middle of the road accounts that are not simple to categorize. These specific accounts are explored further with content-based machine learning tools, as behavior alone is not sufficient to make a precise determination of whether they are automated social media accounts.

65+: The higher the score, the greater the probability of the social media account belonging to an actual human being. In general, social media accounts at or above 65 are human operated.

Example User 1: Friends: 4K, Followers: 45K, Posts: 6K, Application: Twitter for Web Suspicious Base Score: none. Distance from any threshold is large (>5)

Intent Sub-score: 0.7. Based on followers|friends ratios this user seems somewhat influential Spamminess Sub-score: 0

Automation Sub-score: 0

Final Score: 100. This is an influential (not verified user) magazine in their industry space.

Example User 2: Friends: 100, Followers: 180K, Posts: 190K, Application: Twitter Web Client Suspicious Base Score: none. Distance from any threshold is medium (>2.5)

Intent Sub-score: 1

Spamminess Sub-score: 0

Automation Sub-score: 0

Final Score: 100. This is an influential (verified) tech outlet.

Example 3: Friends: 4K, Followers: 4 k, Posts: 6K, Application: IFTTT

Suspicious Base Score: none. Smaller distance from some categories (~1)

Intent Sub-score: 0.1

Spamminess Sub-score: 0

Automation Sub-score: 0

Final Score: 77. This is a human user with some interactive following who happens to use some automation tools (IFTTT) to share content. However due to the smaller post volume combined with an interactive following/friends means that this author is not fully automated. Had they posted from an iPhone or other such personal device their score would likely be higher.

Non-limiting example of above analysis in operation during a live Twitter posting session FIGS. 5-10 give a non-limiting example of a bot net that was discovered on Twitter and that was found to be used to attack a particular company. In this case the company was AMD, a publicly traded company, and the attack may have been intended to temporarily reduce its stock price.

Throughout January and February, a botnet, which appears to originate from Japan, began aggressively pushing vulnerability stories related to other industry clients' vulnerabilities. The above described analysis was used to observe asymmetric attack patterns, featuring amplification, not origination. These interactive networks of automated accounts (which may also be referred to as a "bot network") seem to operate by intentionally amplifying real exploit reports. Their strategy appears to be to trick real people into also retweeting the exploits and ultimately influencing HFT bots or algorithms, reporters or other influencers on the price of the stock. HFT bots/algorithms are High Frequency Trading automated stock automated accounts that trade based on factors in publicly available information, such as news, social media postings, and so forth.

On March 13th, the same botnet began pushing vulnerability stories related to AMD, in addition to other software client vulnerabilities. On March 14th, a small cybersecurity firm called CTS Labs didn't follow industry norms or protocol for reporting a massive BIOS flaw in AMD Ryzen and EPYC processors. The firm didn't alert AMD or industry professionals and went straight to publication. Circumstances around who contacted them and their possible financial arbitrage from their vulnerability Edge suggest illegal or at least subtly coordinated activity.

Figure 5:
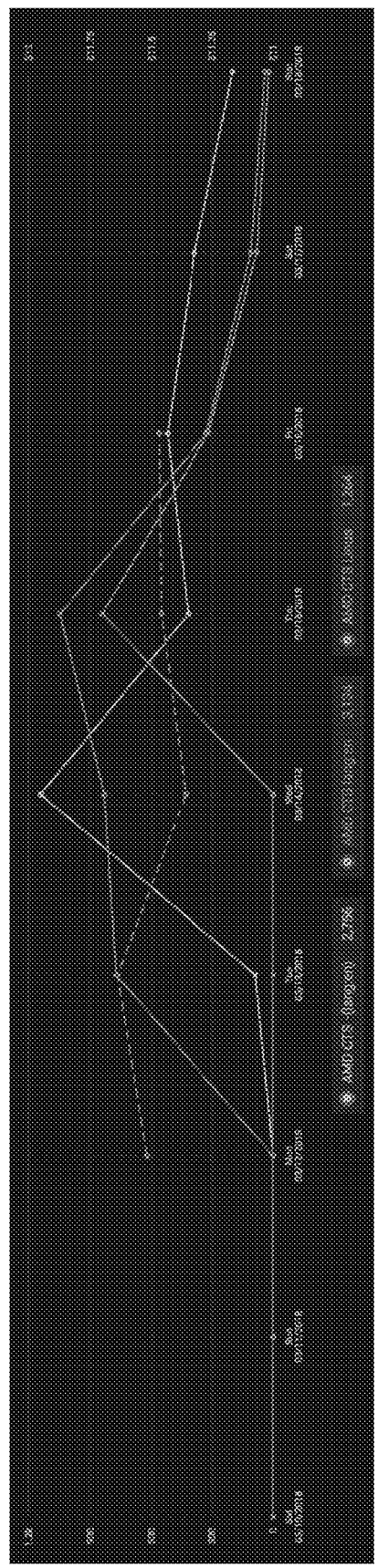
FIG. 5 shows the results of the AMD (Advanced Micro Devices, Inc.) twitter attack as it occurred over time.

FIG. 5 shows the results of the AMD twitter attack as it occurred over time. Upon analyzing the initial spike of non-English language twitter traffic, a bot-network (mainly Japanese) was shown to be driving the conversation (orange line) with nodes that are highly interconnected.

Figure 6:
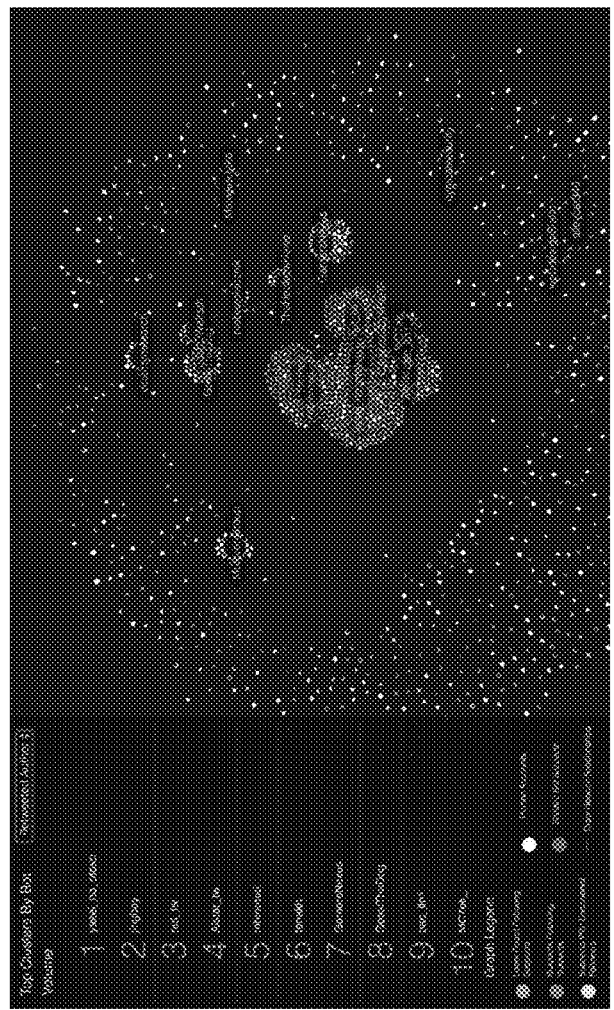
FIG. 6 shows the connections between various entities that are reposting (retweeting) these tweets about AMD, early in the attack.

FIG. 6 shows the connections between various entities that are reposting (retweeting) these tweets about AMD, early in the attack. Typically in these cases, automated accounts will drive up the volume of a conversation in an apparent attempt to drive down stock price.

Figure 7:
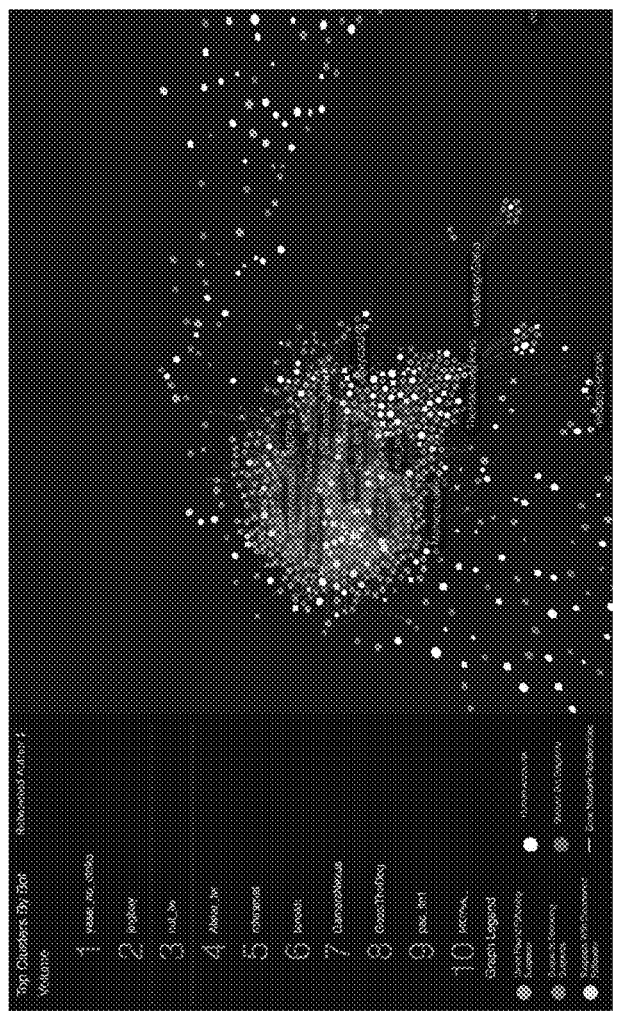
FIG. 7 shows a zoom into part of the network, which started to push a tweet from Linus Torvalds, stating that the apparently vulnerability was not relevant.

FIG. 7 shows a zoom into part of the network, which started to push a tweet from Linus Torvalds, stating that the apparent vulnerability was not relevant. Apparently the bot net was not able to determine whether a tweet was helpful or harmful to its mission, and so blindly retweeted anything related to AMD or the story of the vulnerability.

Figure 8:
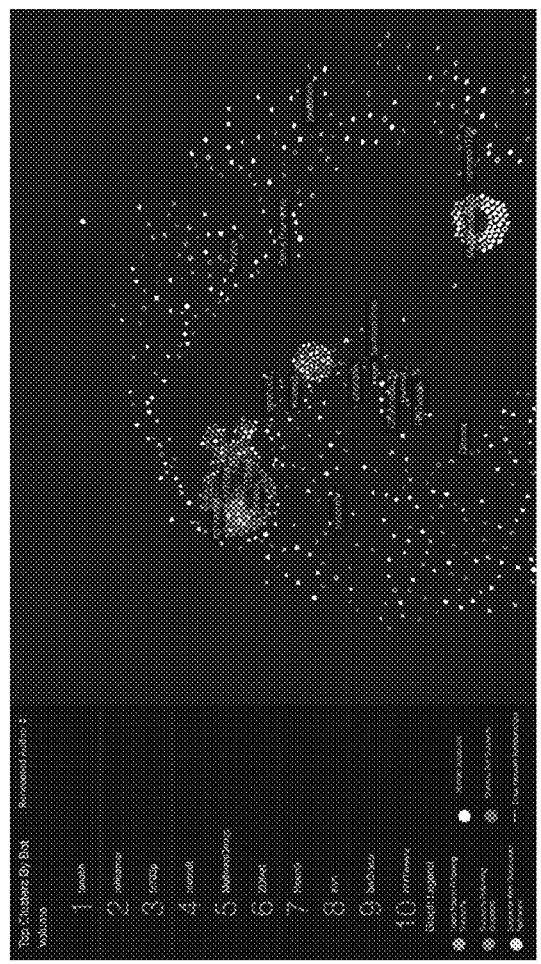
FIGS. 8-10 show other parts of the automated account (bot) network, with FIG. 9 being a zoom into one part of the network and FIG. 10 being a deep zoom into that part of the network.
Figure 9:
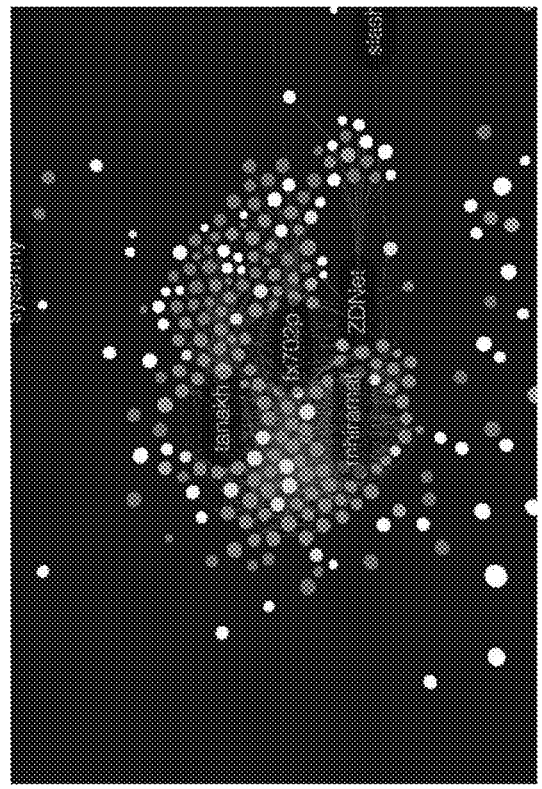
Figure 10:
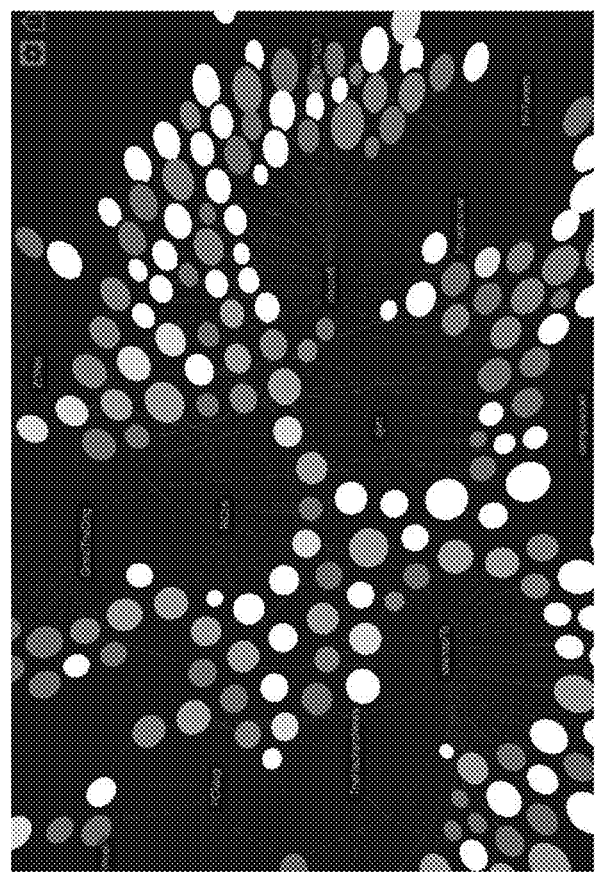

FIGS. 8-10 show other parts of the interactive network of automated accounts, with FIG. 9 being a zoom into one part of the network and FIG. 10 being a deep zoom into that part of the network.

FIG. 11 shows a non-limiting, illustrative example of an API (application programming interface) for obtaining the social media channel information, as part of a detector API service for supporting the detection of automated accounts. The Detector API Service provides a search query, data source, and date range. The data source is a social media channel and its attendant information as described above. The service then queries per that data source (i.e Twitter) and returns the activities, activity clusters, and author/relationship index per that batch of activities.

The number of activities is typically limited to 2000-4000 for speed of analysis. In a high-volume amplification attack, suspicious authors who post at the same intervals may be located by slicing the volume into batches of 2000-4000 activities. With the focus of detection being on the bot-network scale versus an individual author classification scheme, a batch of 2000-4000 tweets has been found to be suitable to detect an interactive network of automated accounts. Optionally it may be determined that a poster is suspicious based on average twitter or other social media posting growth patterns over time.

The pool of suspicious authors (entities) may be reduced as described above or alternatively may include all authors in a particular batch. The Twitter Followers Graph API is queried for this pool of suspicious authors. For each suspicious author correlated with the pool of 2000-4000 tweets, an interactive network of automated accounts may be detected. Knowing that the influence hierarchies are present both in amateur and professional interactive networks of automated accounts, the network characteristics of the group of authors becomes the detection method.

Optionally the above bot network information is used to detect when an attack is starting, so that the attacked company, organization or individual can defend themselves. In small volume queries or early detection scenarios it is possible to use small volumes of 10-50 tweets plus historic suspect data (an automated accounts graph database) to understand if an attack is starting up.

Example 2—Other Botnets

Figure 12:
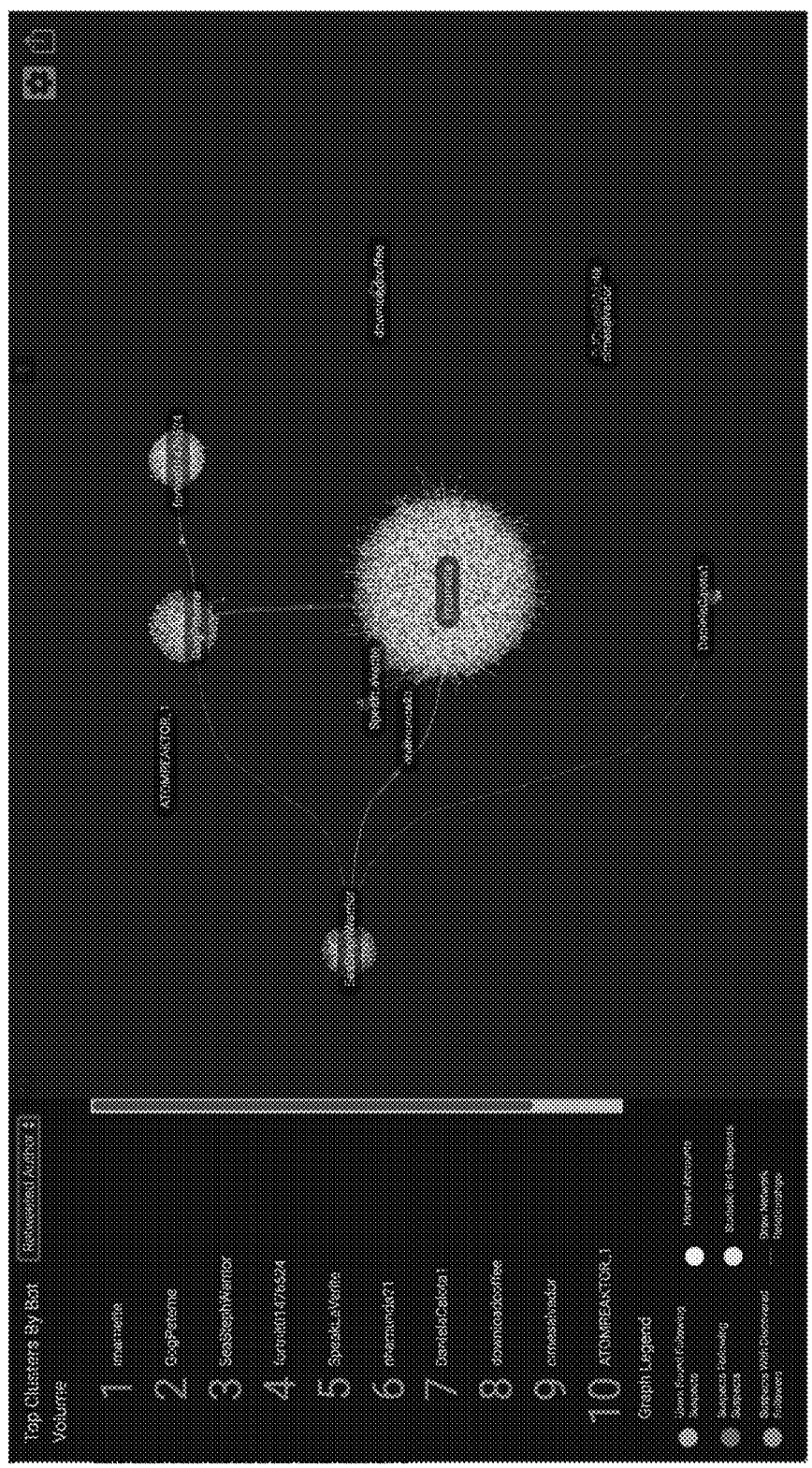
FIG. 12 shows a non-limiting example of botnet clusters and how they may be connected.

Other non-limiting illustrative botnets, or groups of automated accounts that act synchronously, have also been detected using the above methods. For example, FIG. 12 relates to a plurality of different botnet clusters and their connections. Some botnet clusters are connected, while others are not, as shown.

Figure 13:
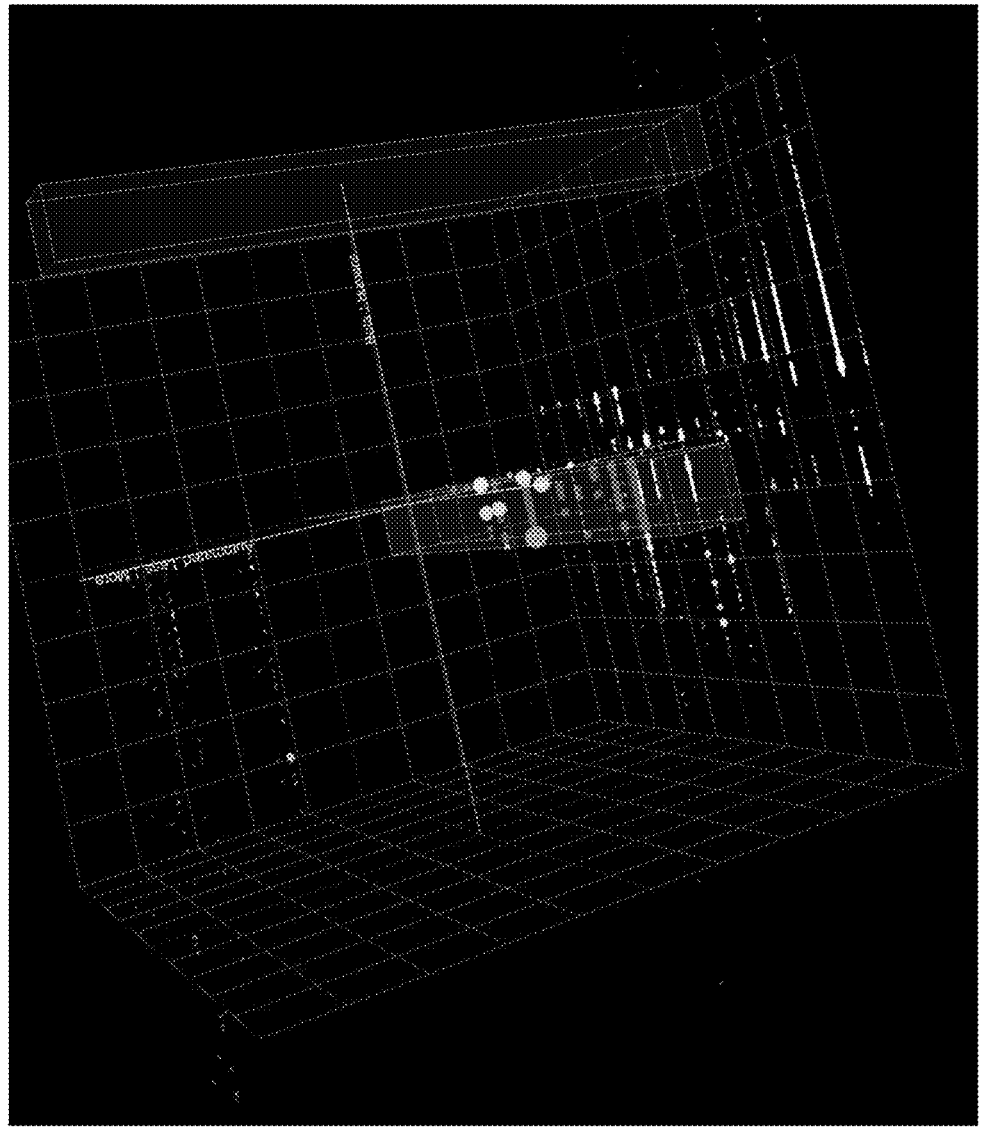
FIG. 13 shows that detected automated accounts, or bots, correlate with greater automation.

FIG. 13 shows that greater automation of accounts is associated with more botnet clusters.

Figure 14:
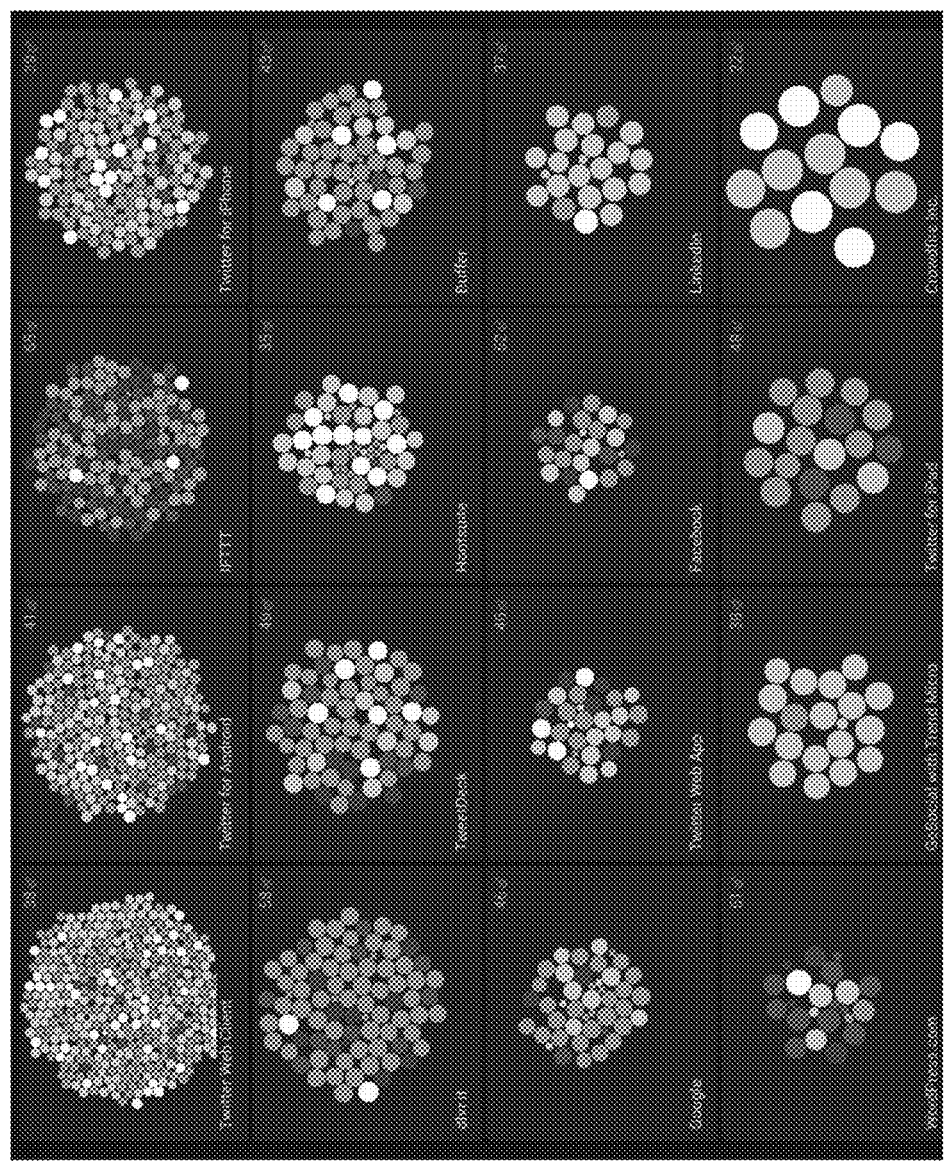
FIG. 14 shows that certain software applications for posting to social media are more likely to be associated with automated accounts than others.

FIG. 14 shows that certain software applications for posting to social media are more likely to be associated with automated accounts than others.

Figure 15:
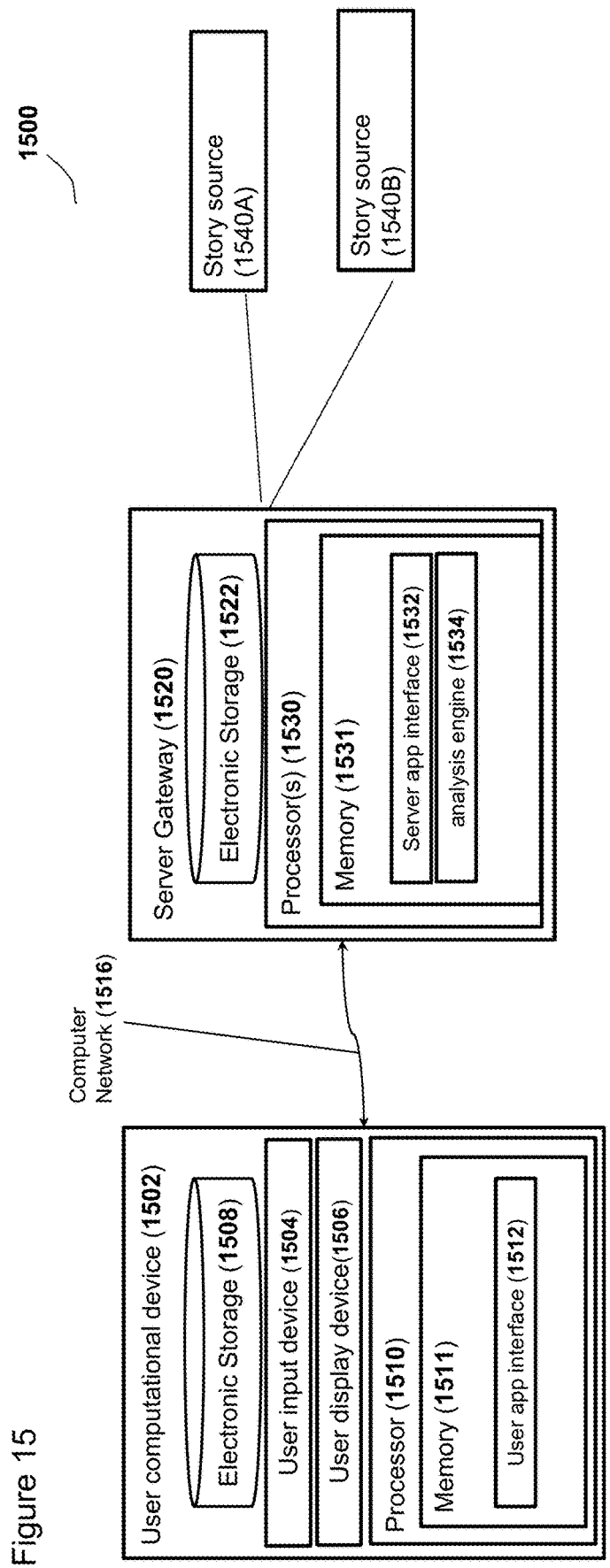
FIG. 15 shows a non-limiting, exemplary system for analyzing at least one source of stories, and optionally a plurality of such sources, for determining posting and responding behavior of the plurality of users.
Figure 16:
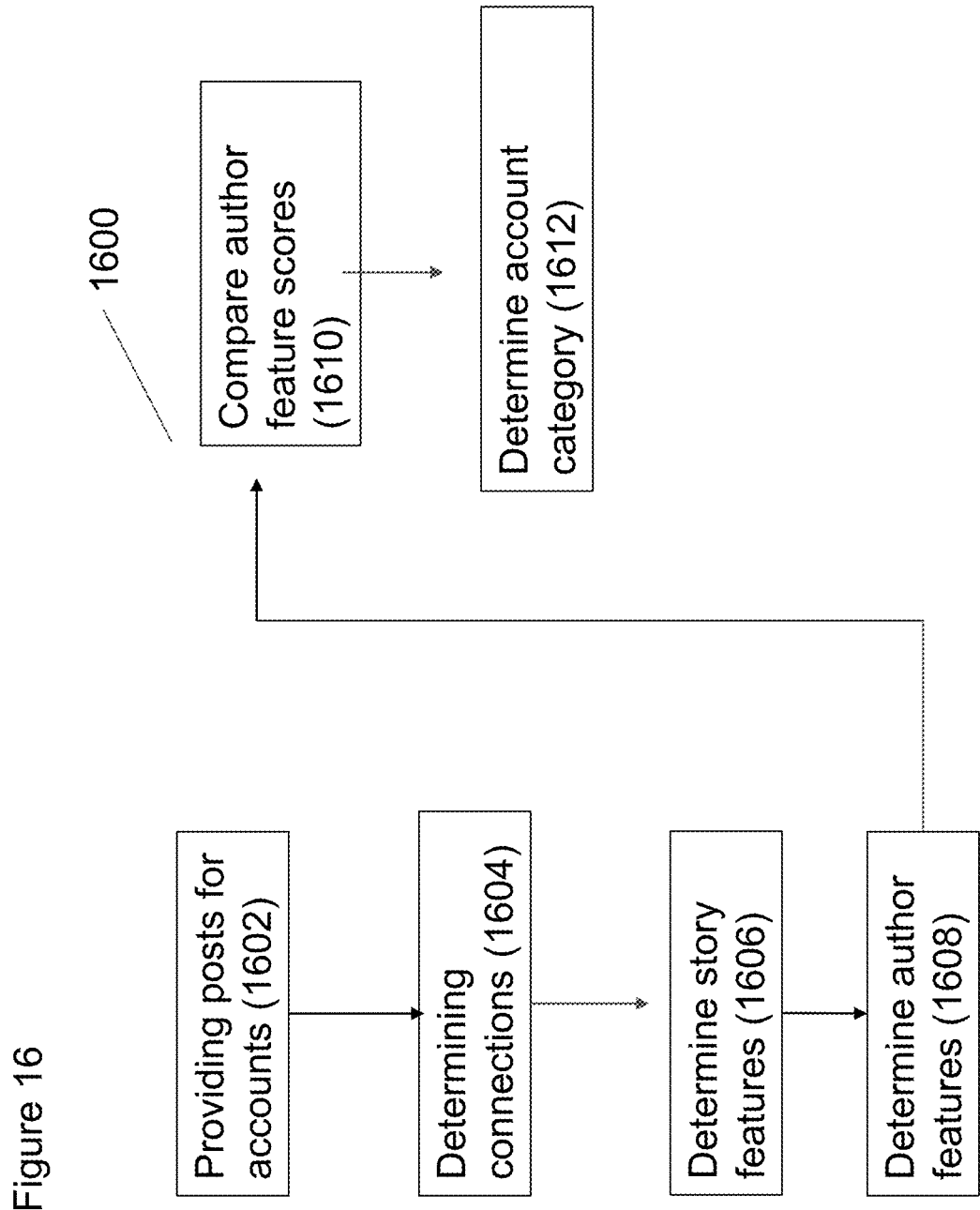
FIG. 16 shows a non-limiting, exemplary method for analyzing behavior of a plurality of accounts, in order to assign them to various categories.
Figure 17:
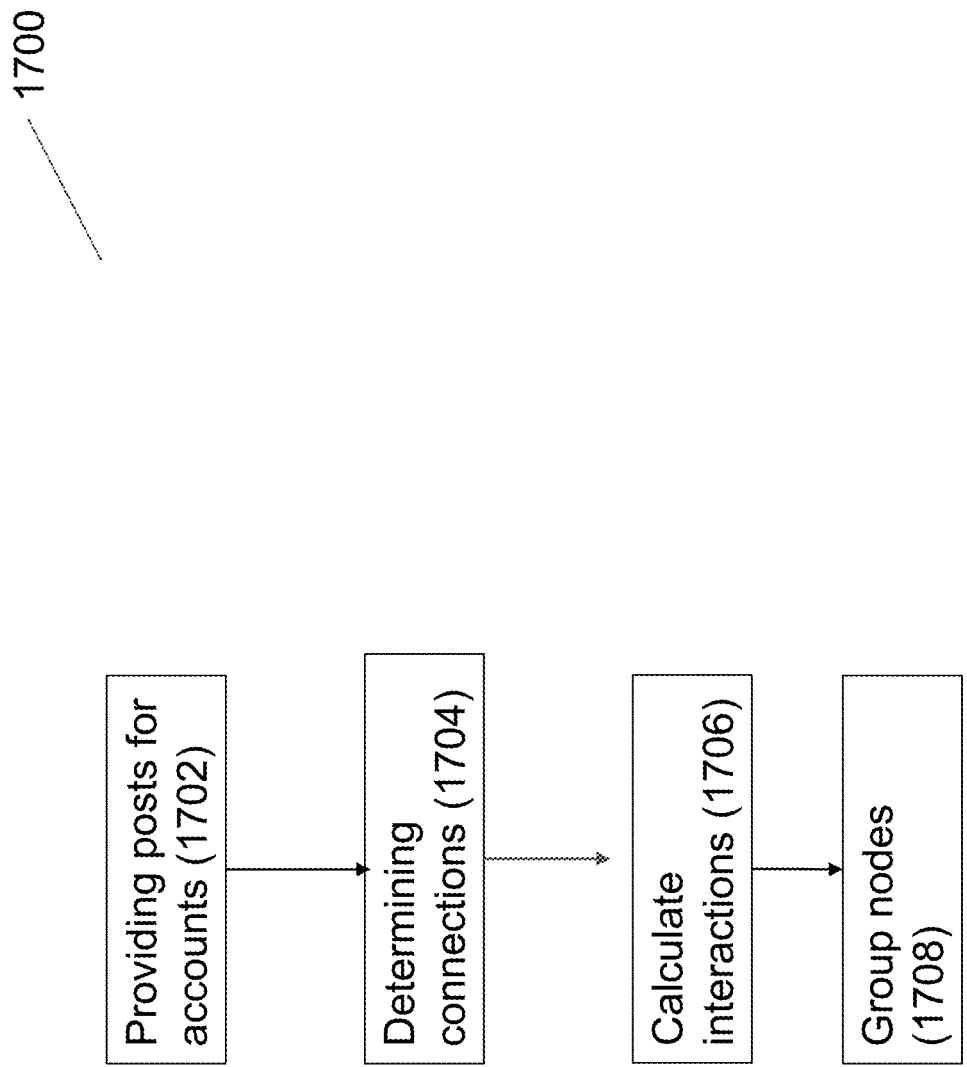
FIG. 17 shows a non-limiting, exemplary method for employing a Louvain algorithm to separate a plurality of accounts (nodes) into a plurality of different communities.

FIGS. 15-17 relate to non-limiting examples of assessing interactions of a plurality of users (accounts who post to a social media channel) within a community. Optionally classifications of such accounts may relate to belonging to a particular community posting within that social media channel. In this context, community discussions are based on interactions between the accounts. A community may comprise a subgroup of the accounts posting to that social media channel. Optionally, multiple classifications of users (accounts) based on their interactions with each other may be determined. Classifications range from a few variations of influencers, repeaters, authentic users, and finally spammers. Such classification may be determined by applying one or more graph algorithms, alone or in combination. While the detailed descriptions of examples provided below relate to the social media channel Twitter, the algorithms and information may be generalized to other social media channels and interactions.

Additionally or alternatively, optionally other sets of algorithms are applied to community detection. The communities can inform what a silo of interactors logically group themselves as, what they discuss, and also what the aggregate composition of the cluster is.

Turning now to the Figures, FIG. 15 shows a non-limiting, exemplary system for analyzing at least one source of stories, and optionally a plurality of such sources, for determining posting and responding behavior of the plurality of users. For example, if a source of stories comprises all accounts within a particular social media channel, such as Twitter as a non-limiting example, then the stories relate to the posts that these accounts post within the social media channel.

User computational device 1502 is in communication with a server gateway 1520 through a computer network 1516, such as the internet for example. Server gateway 1520 may comprise a plurality of servers (not shown) and/or may be in contact with a plurality of story sources 1540A and 1540B, of which two are shown for the purpose of illustration only and without any intention of being limiting, also through computer network 1516. Server gateway 1520 and story sources 1540 may comprise a plurality of servers, a plurality of microservices, a single server each and so forth. Each story source 1540 may comprise a particular social media channel, such as Twitter in this non-limiting example.

User computational device 1502 may direct server gateway 1520 to analyze posts by accounts from one or both of story sources 1540, optionally according to one or more criteria as described herein. Such direction may be provided through interaction with a user input device 1504, which may comprise a mouse or other pointing device, keyboard, touch screen and the like. Server gateway 1520 may then perform such analyses, for example through operation of an analysis engine 1534. The results may then be returned to user computational device 1502 and displayed on a user display device 1506. The display of results on user display device 1506 and also the receipt of commands through user input device 1504 may be performed through a user app interface 1512.

User computational device 1502 also comprises a processor 1510 and a memory 1511. Functions of processor 1510 preferably relate to those performed by any suitable computational processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as a memory 1511 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 1511 is configured for storing a defined native instruction set of codes. Processor 1510 is configured to perform a defined set of basic operations in response to receiving a corresponding basic instruction selected from the defined native instruction set of codes stored in memory 1511. For example and without limitation, memory 1511 may store a first set of machine codes selected from the native instruction set for receiving information from the user through user app interface 1512 and a second set of machine codes selected from the native instruction set for transmitting such information to server gateway 1520 as instructions to return a particular analysis of posts from one or more story sources 1540, for example according to one or more classification methods as described herein, to score for spamminess, and so forth.

Similarly, server gateway 1520 preferably comprises processor 1530 and memory 1531 with machine readable instructions with related or at least similar functions, including without limitation functions of server gateway 1520 as described herein. For example and without limitation, memory 1531 may store a first set of machine codes selected from the native instruction set for receiving instructions from user computational device 1502, and a second set of machine codes selected from the native instruction set for executing functions of analysis engine 1534.

Optionally an analysis computational device as described herein, an ingestion computational device as described herein or a combination thereof are implemented within server gateway 1520 and/or as one or more servers, or a combination of microservices, accessed through communication with server gateway 1520 (not shown).

User computational device 1502 may comprise an electronic storage 1508, for example for storing data locally. Similarly, server gateway 1520 may comprise an electronic storage 1522.

In regard to classification performed by analysis engine 1534, such classification may include but is not limited to determining spamminess, whether a particular account on the social media channel being analyzed is an influencer and so forth. Being an influencer is not limited to having a large following of other accounts. Instead, an influencer may have a relatively small following in comparison to other accounts, which may be only 1%, 5%, 10% or 25%, or any percentage in between, of the number of followers compared to a large account. However, the influencer account may be shown to communicate in ways that connect multiple more influential accounts with larger numbers of followers, and so forth.

Analysis engine 1534 may also analyze interactions of a plurality of accounts from a story source 1540 to determine which accounts belong to a particular community. Each account may belong to more than one community. Communities may also overlap. Overlap may not be determined by subject matter. For example and without limitation, a band, musician, actor or other non-political figure may recommend performing a political act, such as voting generally (without recommending a particular politician for whom to vote) or voting for a particular candidate. Assignment of an account to a particular community may be performed through application of one or more graph analysis algorithms, and/or according to features that determine a behavior of a particular story within a group of accounts, and so forth, as described in greater detail below.

Non-limiting examples of algorithms which may be applied to select a plurality of accounts as belonging to a community and then to optionally determine which of these accounts is an influencer, include but are not limited to page rank variations, Louvain community detection, K-core Decomposition for virality measurement (that is, spread of a post or story within a group of accounts, as described in the article by Stephen B. Seidman, "Network Structure and Minimum Degree", Social Networks, Volume 5, Issue 3, 1983, Pages 269-287, ISSN 0378-8733), Triangle Count (Alon, N., Yuster, R. and Zwick, U; "Finding and counting given length cycles"; Algorithmica 17, 209-223 (1997)), Heuristic rules, Story-level features, Author features, Graph-level features and so forth.

Graph-level features relate to analysis of the temporal and taxonomy scope of a graph. As described herein, each node may represent an account, while edges may represent interactions between accounts. Each node may be any unique interactor. An interactor is an account on the social network with activities comprising (in the non-limiting example of Twitter): original tweets, replies, quotes, retweets, mentions. An original tweet is a post on Twitter. A reply is a reply to that post. A quote is a post that includes another post in a quote format. A retweet is a re-posting of that post, optionally with commentary. A mention specifically connects to another account, using the format "@accountname". Any such post may feature one or more hashtags. Each such post may be described as a "story". The edges provide information about the posts, and interactions with same, but also provide information about the actions of the authors (nodes). Optionally one edge is associated with a type of activity on the social media channel; in the non-limiting example of Twitter, the types of activities comprise original tweets, replies, quotes, retweets, mentions. Optionally applying a particular hashtag or plurality of hashtags may be an activity, as may applying a particular emoji or plurality of emojis. Optionally, rather than being associated with a type or category of activity, each edge is associated with a single activity.

Graph-level features that may be used as parameters for classification include but are not limited to: Minimum PageRank score of all interactors; Maximum PageRank score of all interactors; Standard Deviation PageRank score of all interactors; Standard Deviation Triangle Count score of all interactors; Stdev Triangle Count score of all interactors; 90th percentile of Triangle Count score of all interactors; 90th percentile of PageRank score of all interactors; 99.9th percentile of Triangle Count score of all interactors; or 99.9th percentile of PageRank score of all interactors; or a combination thereof.

Optionally, multiple edges are applied to each pair of nodes, with one directionally unique edge between any two nodes for each type of permitted interaction for a particular social media channel. In this non-limiting example of the social media channel Twitter, such interactions comprise Retweet, Reply, Quote and Mention. Each directional edge contains a list of entities (hashtags, mentions, places, people). Each unique edge contains a weight which is the sum of the types of interactions. For example, if account A replies to five tweets of account B, the edge weight of the edge between accounts A and B would be 5.

Story-level features include but are not limited to (for the non-limiting example of Twitter) Entities (@mention, hashtag) and Subtype: Reply, Quote, Retweet, Original Tweet. An entity may be a mention of another account by name. A hashtag relates to a user defined topic.

Author features may comprise PageRank Inbound and PageRank Outbound. Pagerank Inbound uses a directed graph in which edges represent the interaction as well as the direction of the interaction. Pagerank Outbound is the PageRank algorithm as applied on the same graph structure and weights as for PageRank Inbound, but with reversed edge directions. As a non-limiting example, if account A replies to five tweets of account B, the edge weight of the (reply) edge between accounts A and B would be 5. For Pagerank Inbound, the graph features a directed (reply) edge from B to A with the weight of 5. For PageRank Outbound, the graph features a directed (reply) edge from A to B with the weight of 5.

Other non-limiting examples of author features may comprise Triangle Count; Min/Max/Average text entities (@mention, hashtag, NER/named entities) count for all edges, inbound and outbound; Interactions inbound; Min/Max/Average PageRank score per inbound interactor; Min/Max/Average Triangle Count score per inbound interactor; Interactions outbound; Min/Max/Average PageRank score per inbound interactor; Min/Max/Average Triangle Count score per inbound interactor. An inbound interactor may be defined as author (node B from the above example) who directionally is interacting (mentioning, quoting, retweeting) with another node (node A in the above example).

In regard to interactions inbound and interactions outbound, it may be noted that such features may also be used to characterize the graph. More generally, author properties may be used in a number of ways, including with regard to global application and per dataset. The global application may include author profile metrics (post count, follower count, other author properties), author_age, automation score and subscore. The per dataset application may include graph inbound/outbound author properties, including but not limited to author properties from the dataset, including but not limited to: (outlinks, weighted, per subtype) number of stories per subtype (tweets/retweets/replies/etc) for each author; (outlinks, unique, per subtype) unique story count per subtype (tweets/retweets/replies/etc) for each author per original_author; how many unique authors A replied to; inlinks, weighted, per subtype; and inlinks, unique, per subtype.

An outlink is a single edge, per subtype (original tweet, retweet, mention, quote) which is weighted by the frequency of the interactions between node A and node B. From the perspective of node A, if node A mentions node B 300 times, the interactions are traveling outward from node A to node B, there is one edge of type mention as an outlink, and the weight is 300 from A to B.

An inlink is a single edge, per subtype (original tweet, retweet, mention, quote) which is weighted by the frequency of the interactions between node B and node A. From the perspective of node A, if node B mentions node A 300 times, the interactions are traveling directionally inward from node B to node A, there is one edge of type mention as an inlink, and the weight is 300 from B to A.

Optionally, parameters are derived from graph level features with the purpose of defining threshold/parameters to test author-level features for the purposes of classification. These parameters may also be referred to as variables. For example: A graph with 3-million interactors (nodes or authors) may be expected to have very different graph level feature parameters than a graph with 3-thousand nodes. The graph level features may be used to set variables as parameters, which are used in the various classification heuristic rules which compare various author level feature values against thresholds defined by the following variables derived from the graph level features. Such parameters may include but are not limited to: Triangle count Authentic=standard deviation triangle count*2; Triangle count Influencer®=standard deviation triangle count*4.5; Triangle count influencer 1=standard deviation triangle count*8; Triangle count influencer 2=standard deviation triangle count*9; Pagerank influencer0=standard deviation pagerank*1.5; Pagerank influencer 1=standard deviation pagerank*15; Triangle count spam0=standard deviation triangle count*2; Pagerank spam0=90th percentile pagerank*5; Triangle count spam)=standard deviation triangle count/2;

These parameters may then be used or applied to characterize and categorize authors (social media accounts, also described as interactors (or in the context of the graph, as nodes)). Author classifications include but are not limited to the following. Authentic author class includes authors that are not quite influencers but behavior indicates that they are active. Rule: match any author who mentions any other author WHERE (author triangleCount is >[triangle count authentic variable] AND author pagerank inbound score<1 AND author pagerank outbound score >1) AND average subtypes per interaction (ex: mention, hashtag) are <=3.5

Influencer author class includes nodes that have a high outbound pagerank score >100, triangle count>=900, and average number of mentions per tweet<=1.618 (without including spamming). Rule: match any author who mentions any other author WHERE (author triangle count score >[triangle count influencer0 variable] AND author pagerank inbound<1 AND author pagerank outbound score >[pagerank influencer 0 variable]) AND (author triangle count score >=[triangle count influencer0 variable] OR author average subtypes per interaction (ex: mention, hashtag) are <=1.618).

The influencer author class may also include nodes that have a high outbound pagerank score >100, triangle count>=1000, which is a slightly higher score than the last influencer tier. Rule: match any author WHERE author triangle count score >[triangle count influencer2 variable] AND author pagerank inbound score<1 AND author pagerank outbound score >[pagerank influencer0 variable].

The influencer author class may also include nodes that have a high natural pagerank score >[pagerank influencer1 variable], triangle count>=[triangle count influencer0 variable]. As a non-limiting example, this class may include individuals who are famous beyond the social media channel, as they have such a high natural pagerank score. Rule: match any author WHERE author triangle count score >[triangle count influencer0 variable] AND author pagerank inbound score<1 AND author pagerank outbound score >[pagerank influencer1 variable]

Authentic Influencer class may include an influencer who has many different subtypes per interaction (ex: mentions, hashtags, etc), such that they may not be included in another authentic class. Rule: match any author who mentions any other author WHERE ("influencer" has already been marked on the author classification AND author triangle count>[triangle count authentic variable] AND author pagerank inbound<1 AND author pagerank outbound>1) AND average number of subtypes per interaction (ex: mention, hashtag)>=3.5

Loud Influencer class may include an influencer with a very high triangle count score, who may have a higher inbound pagerank score (may seem spammy, for example due to such behaviors as having a higher frequency of tweets than normal), and outbound pagerank is >[pagerank influencer0 variable]. This class features influencers who tweet frequently in the conversation. Rule: Match any author WHERE author triangle count score >[triangle count influencer2 variable] AND author pagerank inbound>=1 AND author pagerank inbound score<=3 AND author pagerank outbound score >=[pagerank influencer0 variable]

Non-Interactive Influencer class may include an influencer with a low triangle count score. Such an influencer may be a person who is famous outside of the social media channel, who may publish infrequently, but whose posts (such as tweets) receive a great deal of interactions. These interactions may relate to a community that is built around the influencer. Rule: match any author WHERE author triangle count score<[triangle count influencer0 variable] AND author pagerank inbound score<1 AND author pagerank outbound score >[pagerank influencer0 variable]

Spam accounts may be classified in various ways. For example, a first spam classification is a mention spammer with triangle count>[triangle count spam0 variable], a inbound pagerank score >=2 (loud-ish), yet natural pagerank<[90th percentile pagerank variable], such that very few accounts are interacting with this author. Rule: match any author WHERE author triangle count>[triangle count spam0 variable] AND author pagerank inbound score >=2 AND author pagerank outbound score<[90th percentile pagerank variable] AND author is not verified by the social media provider Another non-limiting example of a spam classification is a mention spammer with triangle count>[triangle count spam0 variable], inbound pagerank>1 (can be mildly loud), outbound pagerank<[90th percentile pagerank variable], however the average # of mentions per post is higher at >=3. Rule: match any author mentioning any other author WHERE author triangle countinbound>1 AND author pagerank outbound<[90th percentile pagerank variable] AND author is not verified by the social media provider AND average number of mentions per activity is >=3

Another non-limiting example of a spam classification is a mention spammer with a higher inbound pagerank score >=10, spammy triangle count score, and an outbound pagerank score lower than the spam pagerank threshold. This author publishes frequently (is "loud") but few other accounts are receiving the posts. Rule: match any author WHERE author triangle count>[triangle count spam0 variable] AND author pagerank inbound>=10 AND author pagerank outbound<=[pragerank spam0 variable] AND author is not verified by social media provider Another non-limiting example of a spam classification is a mention spammer who is mention spamming frequently (>=6 mentions per post on average). Such authors are not loud in volume of tweets, but loud in frequency of mentions per tweet. Rule: match any author mentioning any authors WHERE author triangle count>[triangle count spam0 variable] AND pagerank inbound score<1 AND pagerank outbound>1 AND pagerank outbound<[pagerank spam0 variable] AND author is not verified by social media provider AND average number of mentions per tweet is >=6

Another non-limiting example of a spam classification is a mention spammer who may have a lower volume or otherwise engage in slightly less spammy mention behavior. Rule: match any author who mentions other authors WHERE author triangle count>[triangle count spam0 variable] AND author pagerank inbound<1 AND author pagerank inbound>[90th percentile pagerank variable/2] AND pagerank outbound<[90th percentile pagerank variable] AND author is not verified by social media provider AND average number of mentions per activity is >=3

Another non-limiting example of a spam classification is a mention spammer who may sit somewhere in the middle of a network of mention spamming accounts. They have a little bit higher outbound pagerank score which means that somebody interacts back with them. However they have an average number of mentions per post>=5, meaning they are relatively loud in mentions per post. Rule: match any author who mentions another author WHERE author triangle count>[triangle count spam0 variable] AND pagerank inbound>1 AND pagerank outbound>[90th percentile pagerank variable] AND pagerank outbound<[90th percentile pagerank variable*2] AND author is not verified by social media provider AND average number of tweets per post>=5

Loud Mention Spam classification relates to a high volume mention spammer. Such an account typically has a higher inbound pagerank, with many mentions on average, such as a number of mentions that is greater than or equal to 15 mentions in a single post. Rule: match any author who mentions another author WHERE author pagerank inbound>1 AND author pagerank outbound<[90th percentile pagerank variable*2] AND author is not verified by the social media provider AND average number of mentions per tweet is >=3.5 and max number of entities in any activity by this author is >=15

Spam Gaming Pagerank Algorithm classification relates to a mention spammer account that is trying to game the pagerank algorithm. This type of account usually has a higher inbound pagerank, with many mentions on average, such as >=15 mentions in a single post. The higher outbound pagerank means that somebody is interacting back with them (which may be from bought retweets), however combined with the high volume of mentions per post means this person is very loud in mentioning per post and likely spamming with a fake network. Rule: match any author mentioning another author WHERE author pagerank inbound>1 AND author pagerank outbound>[pagerank spam0 variable] AND author is not verified by social media provider AND average mentions per tweet>=3.5 AND max mentions in any tweet>=

Suspicious classification is for accounts that exhibit slightly unusual behavior. They have a higher than normal triangle count for somebody with a very low outbound pagerank of <0.5. The inbound pagerank>1 suggests that this account is very loud but is not getting anything back in return from interactors. Rule: match any author WHERE triangle count<[triangle count spam1 variable] AND pagerank inbound>1 AND pagerank outbound<[90th percentile pagerank/2] AND author is not verified by social media provider.

Each of the above-described features or groups of features may then be analyzed according to one or more algorithms as described in greater detail below. Various algorithms may be applied to analysis of PageRank features. For example, a PageRank Outbound algorithm may assign every node a score by walking outward through the graph recursively starting at each node. By "walking" it is meant considering each node and determining a number of connections to each other node. As such connections preferably represent actual interactions (as opposed to static follows), each such algorithm may be applied to determine which node is influential in a community of nodes, according to how interactions are performed within nodes.

A PageRank Inbound algorithm may perform such an analysis in reverse, by assigning every node a score according to the distances of all the paths that lead to any node in the graph. Page Rank Inbound may be used for example to identify authors who may be manipulating the traditional PageRank Outbound score in order to seem influential. As a non-limiting example, such a node may purchase a plurality of fake retweets. In a non-limiting example of an inbound pagerank scenario, if an account purchases retweets, the authors interacting with a tweet from that account (the purchased retweeters) would have no other connections in the graph, and thus a very low page-rank score may be assigned to that account. This algorithm may avoid or at least reduce problems in applying an outbound/traditional PageRank score, which may reward such a fraudulent account with a much higher score.

Page Rank Inbound may also be used to detect nodes that may be spamming the network with high volumes of traffic with very little or even no reach. Such nodes send high volumes of posts each day, such as 500 tweets in the example of Twitter, but receive only a few (1-2 as an example) interactions on this daily high volume of tweets.

Nodes that are actually influential may be detected through a combination of such algorithms, because they have a high inbound and outbound score for PageRank. They have many interactions with other nodes in relation to their volume of posts, and these interactions include both nodes that are close in the graph and those that are far in the graph, indicating that their ideas have spread through the community that is defined by the graph or a subset of the graph.

The Triangle Count algorithm may be performed as follows. It assigns every node a Triangle Count score which walks the graph recursively and then determines the size of a network required in order to connect the longest path from a node and back to it. The Triangle Count algorithm counts the number of triangles for each node in the graph (see for example "Efficient Semi-streaming Algorithms for Local Triangle Counting in Massive Graphs", by Luca Becchetti et al, KDD'08, Aug. 24-27, 2008, Las Vegas, Nevada, USA; ACM 978-1-60558-193-4/08/08). A triangle is a set of three nodes where each node has a relationship to the other two. In graph theory terminology, this is sometimes referred to as a 3-clique. Triangle counting may be used to detect communities in social network analysis, and measure the cohesiveness of those communities. It may also be used to determine the stability of a graph, and is often used as part of the computation of network indices, such as clustering coefficients.

The triangle count may be applied as another feature in conjunction with the two PageRank algorithms (Inbound and Outbound) in order to calculate multiple intents of influence and/or different categories of influencer. One example of an influencer category is an Organic Influencer. They are not necessarily famous (but also can be), but they are probably an expert in the topic and have many discussions happening through posts across the social media channel. Each discussion may be expected to have a lot of traffic, and the interactors (social media accounts or nodes in the graph) also have interactions inbound and outbound. The organic influencer may be considered as an interactive, active, influential account within an interactive group.

A Non-Interactive Influencer may be a famous person with a large following. They can enter a conversation, and may make one single comment/retweet/etc, but typically do not engage in a great deal of interaction or dialog. Their volume and extent to which their posts are amplified may determine that they are an influencer. However, they are typically less active on a particular topic and may also participate less in interactions with other community members.

An Influencer Loud may be a famous person who is also an expert on the topic of discussion. They engage actively with the active parts of the community with a high reach, as they combine features of both the organic influencer and the non-interactive influencer.

A Repeater is an account who re-tweets (re-posts) the posts (tweets) of influencers.

An Authentic account may be an account which appears to be a real person participating in the discussion, but who however does not have enough reach to be called an influencer.

Suspicious accounts may engage in spammy behavior which may not rise to the level of being considered a spammer or bot. They may have a lower triangle count, and a sufficiently significant PageRank outbound score to warrant that something may be off about the authenticity of this account.

Turning back to the Figures, FIG. 16 shows a non-limiting, exemplary method for analyzing behavior of a plurality of accounts, in order to assign them to various categories. As shown in regard to a method 1600, the flow begins at 1602 when posts are provided for a plurality of accounts, which may optionally comprise a subset of accounts on a social media channel, or even all accounts. The plurality of posts preferably comprise posts provided at different points in time. At 1604, a plurality of connections between accounts (nodes) are preferably determined according to the analyzed posts. As previously described, each pair of nodes may be connected according to each separate interaction. Optionally, the interactions are grouped by category for a particular edge and then a weight assigned for the number of interactions in each category. For example, interactions between accounts A and B may be categorized into retweets, likes and so forth for the social media channel Twitter, as examples of permitted categories of interactions; the number of interactions in each category may be applied to the edge for that category as a weight. Optionally the interactions are counted for a period of time such as an hour, a day, a plurality of days, a week, a plurality of weeks, a month, a plurality of months, a quarter, a year or any other time period in between. The period of time may vary according to the desired goal for the analysis.

At 1606, a plurality of story features may be determined for a particular post and/or topic. The story features may relate for example to the number of interactions by category for a particular story across a plurality of accounts, shared use of hashtags, which accounts are mentioned (named) in posts by which other accounts, and so forth. The story features may be determined per post or per topic. For the latter, preferably the topic is determined by providing the posts in a scoped dataset.

At 1608, a plurality of author features are preferably determined for the period of time being analyzed. As described above, PageRank Inbound and PageRank Outbound algorithms may be applied, alone or in combination, or alone or in combination with a Triangle Count algorithm. These scores are preferably determined as described above, to analyze both the activity of particular authors (accounts) and also how these authors interact with each other across a plurality of accounts.

An author (a node in the graph) may publish multiple stories. The features of that story (a mention, retweet, reply, quote) aggregate into an edge connecting to another node. The types of interactions often determine the behavior of an author. As a non-limiting example, an author node that generally mentions 50 users per post on average may be considered to be behaving in a spammy way. As another non-limiting example, an author node that retweets a set of other author nodes 50-100 times on average, but they do not interact in return with that author node, the account is exhibiting "repeater" behaviors. Story features are derived from the content and the type of the interactions. These feature values are aggregated by properties from the story— eg. by topic, or hashtag, or named entity, and interaction type. Node level (that is, author properties) are derived from the inbound/outbound edges of a node (author); and the properties of these edges are aggregated.

At 1610, the author features and the accompanying scores are preferably compared. For example, such a comparison may be used to isolate one or more suspicious accounts. These accounts may not be sufficiently spammy to be labeled as an automatic account (or "bot"), but may still be behaving in a suspicious manner. The comparison may also be used to locate one or more influential accounts within a group of such accounts.

At 1612, the accounts may be categorized as described herein, according to the above comparison of the scores.

Various algorithms may then be applied to sort the plurality of accounts into a plurality of communities. As previously described, the Louvain algorithm may be used for community detection, to determine which nodes within a larger graph are part of a community. As a non-limiting example, if the graph represents the entire social media channel with all accounts, then the Louvain algorithm may be used to locate groups of nodes within the larger graph that form a community. For example, the Louvain algorithm may be used to analyze a graph of —500$k$ users. Louvain uses the interactions (edges) between each author node plus the edge weight (number of times any two nodes interacted) to compute a small number of communities based on their interactions/topics of interest. These communities represent portions of the graph or sub-graphs.

For each community, it is possible to determine aggregate percentages of interactors within the community. For example, within the community, there may be a plurality of clusters. In one cluster, a group of spammers/automated users may drive 80% of the posts, while other clusters may comprise a higher percentage of authentic accounts.

A group of organic influencers may interact with a large community of engaged users to discuss a topic. Movement of the topic across the community, in the form of interactions with a plurality of posts, may then show how the topic trends within the community.

One non-interactive influencer may be featured in 5000 retweets from repeater classes of users.

It is also possible to determine logical groupings of users (accounts) based on topics/subtopics within a broad dataset. In one example, 1.5 M stories (posts) about a broad search of "music or dancing" may be fed into the Louvain algorithm. The output clusters are mostly music genre/sub-genre based, or topic focused clusters of interaction. The communities interaction/engagement patterns derive the logical groupings of the data.

Turning back to the Figures, FIG. 17 shows a non-limiting, exemplary method for employing a Louvain algorithm to separate a plurality of accounts (nodes) into a plurality of different communities. As shown in regard to a method 1700, the flow begins at 1702 when posts are provided for a plurality of accounts, which may optionally comprise a subset of accounts on a social media channel, or even all accounts. The plurality of posts preferably comprise posts provided at different points in time. At 1704, a plurality of connections between accounts (nodes) are preferably determined according to the analyzed posts. As previously described, each pair of nodes may be connected according to each separate interaction. Optionally, the interactions are grouped by category for a particular edge and then a weight assigned for the number of interactions in each category. For example, interactions between accounts A and B may be categorized into retweets, likes and so forth for the social media channel Twitter, as examples of permitted categories of interactions; the number of interactions in each category may be applied to the edge for that category as a weight. Optionally the interactions are counted for a period of time such as an hour, a day, a plurality of days, a week, a plurality of weeks, a month, a plurality of months, a quarter, a year or any other time period in between. The period of time may vary according to the desired goal for the analysis.

At 1706, the interactions are calculated, for example as described above, by determining the edges (connections) between each pair of nodes and then optionally categorizing the interactions. The weight of the interactions is then preferably determined for each edge. At 1708, the nodes are grouped into a plurality of communities according to the calculated interactions. Optionally, one or more nodes may be left out if they cannot be clearly included in a community.

Optionally, author classification may be performed according to supervised modeling with labeled data. The models that may be applied include but are not limited to modified logistic regression (regularization L2) and gradient boosting models (Andrew Ng, "Feature selection, L1 vs. L2 regularization, and rotational invariance", ICML '04: Proceedings of the twenty-first international conference on Machine learning, July 2004; Natekin, Alexey and Knoll, Alois (2013), "Gradient Boosting Machines, A Tutorial", Frontiers in Neurorobotics. 7. 21. 10.3389/fnbot.2013.00021). The posts, interactions and author information may be subjected to Neo4j graph database analysis before the model is trained. Alternatively, the posts, interactions and author information may be analyzed before the model is trained.

The labels may be detected by using experimental rules. For example, probabilistic labeling may be used to label data for training. Rather than binary classification of the authors, a continuous value of the prediction (e.g. $0<p<1$) may be used as a label for a particular author in regard to a particular category. It would then be possible to analyze predictions that fall marginally into a category (that is, authors that have some likelihood, but not a strong likelihood, of falling into a particular category). This process may reveal specific users that do not clearly fall into one category. It could result in finding new groups or relabeling of the authors.

Synthetic training data may also be created and used, additionally or alternatively. In many cases available authors that fall into a certain category are limited and it might be helpful to create and use synthetic training data to balance the information that is being fed into the algorithm.

Machine learning algorithms may be applied to improve distinction between users in a non-supervised way, e.g. cluster and score similar authors, then use those labels as a new feature in classification.

Feature engineering may be improved by extracting certain information about each author's behavior could help the distinction between authors. Time related features that distinguish each author's behavior are an example in this case.

Further feature extraction and engineering may include adding and/or modifying features to the baseline (initial) model in order to: exclude the most expensive graph stats (PageRank, triangle count, cluster statistics); generalize the model across (graph) datasets more consistently by adding properties of the dataset, including but not limited to number of nodes (authors union original_authors), edges (stories), unique edges (unique stories per author and original_author), number of days of the dataset, general author properties, author properties from the dataset, time/age-derived properties; and improving evaluation metrics (precision, recall, F1 score, etc).

Additional features include modified categorical features, log values, normalized PageRank, profile type and language mix index.

General author properties may include but are not limited to author profile metrics (post count, follower count, other author properties), number of days since author created_at (author_age, or date/time that the author account was created), and automation score and subscore. Author properties from the dataset (graph level) may include but are not limited to outlinks, weighted, per subtype; number of stories per subtype (tweets/retweets/replies/etc) for each author, outlinks, unique, per subtype; unique story count per subtype (tweets/retweets/replies/etc) for each author per original_author (how many unique authors A replied to); inlinks, weighted, per subtype; and inlinks, unique, per subtype. Time/age-derived properties may include stories/edges per day, unique edges per day, user post per day(post_count/author_age, follower count per day, other author properties per day); comparing deviation of posts for user against himself. For example, a user (node A) mentions 200 users on twitter in 3 posts every day, this behavior may be considered to be spammy. As another non-limiting example, every day a user (node B) mentions an average of 1.5 users in 45 posts. Suddenly, this same user mentions 200 users in 3 posts during 1 day. This change in posting may not be considered as spammy behavior because it is not their normal behavior pattern. It could be measured as some notable anomalous event for this user, but it would not classify this user as a spammer.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for detecting an interactive network of a plurality of automated accounts posting to a social media channel, wherein each automated account is operated by at least one social media account computational device, the system comprising: an ingestion computational device comprising a first memory for storing a plurality of first instructions and a first processor for executing said first instructions, wherein said first instructions include instructions for:
connecting to the social media channel; and
receiving a plurality of social media postings from a plurality of social media accounts;
the system further comprising an analysis computational device comprising a second memory for storing a plurality of second instructions and a second processor for executing said second instructions, wherein said second instructions include instructions for:
analyzing said social media postings according to interactions between said social media accounts; and
determining which of said posting entities are in a community according to said analyzing;
and a computer network for communication between said computational devices;
wherein said ingestion engine obtains social media messages for a plurality of social media accounts, said ingestion computational device transmitting said social media messages to said analysis computational device; and
wherein said analyzing said interactions is performed according to an algorithm selected from the group consisting of: page rank variations, Louvain community detection, K-core Decomposition for virality measurement, Triangle Count, Heuristic rules, Story-level features, Author features and Graph-level features.

2. The system of claim 1, wherein said interactions between said social media accounts are selected from the group consisting of likes, re-posting, quote posting, commenting, replies and mentions.

3. The system of claim 1, wherein said instructions on said analysis computational device further comprise instructions for placing said social media accounts as nodes on a graph, with said interactions between said social media accounts being represented as edges; and analyzing said interactions according to one or more features of said graph.

4. The system of claim 3, wherein each set of interactions between each pair of nodes is decomposed to a plurality of edges, wherein each edge represents a type of interaction.

5. The system of claim 4, wherein said edge is weighted according to a number of each type of interaction.

6. The system of claim 3, wherein each set of interactions between each pair of nodes is decomposed to a plurality of edges, wherein each edge represents a single interaction.

7. The system of claim 3, wherein said instructions on said analysis computational device further comprise instructions for analyzing said interactions between said nodes to determine if a node belongs to a community according to one or more graph parameters selected from the group consisting of: Minimum PageRank score of interacting nodes; Maximum PageRank score of interacting nodes; Standard Deviation PageRank score of interacting nodes; Standard Deviation Triangle Count score of interacting nodes; Stdev Triangle Count score of interacting nodes; 90th percentile of Triangle Count score of interacting nodes; 90th percentile of PageRank score of interacting nodes; 99.9th percentile of Triangle Count score of interacting nodes; or 99.9th percentile of PageRank score of interacting nodes; or a combination thereof.

8. The system of claim 1, wherein said interactions are analyzed for automatic behavior by a social media account, such that said social media account is at least partially determined to belong to said community according to said automatic behavior.

9. The system of claim 1, wherein said social media computational device comprises one or more of a laptop, a PC, a mobile communication device, a mobile telephone, a tablet computational device and a plurality of cloud based computational services.

10. The system of claim 9, wherein said social media computational device comprises a support social media application for posting social media messages to said social media channel in an automated manner, wherein said analysis computational device determines an automation behavior score for a social media account associated with said social media computational device at least partially according to a characterization of said support social media application, such that said automation behavior score at least partially determines whether said social media account belongs to said community.

11. The system of claim 1, wherein said memory of said analysis computational device comprises a first set of machine codes selected from the native instruction set for receiving instructions from said ingestion computational device, and a second set of machine codes selected from the native instruction set for executing functions of analysis engine; wherein said analysis computational device comprises an operating system and wherein said operating system determines said native instruction set; and wherein each set of machine codes is stored on a memory associated with said computational device.

12. The system of claim 1, wherein said analyzing said interactions further comprises recursively analyzing a plurality of interacting social media accounts, to detect one or more suspect accounts that are suspected of belonging to the community; calculating a score for each suspect account; and labelling a suspect account as member of the community if said score is above a cut-off threshold.

13. The system of claim 12, wherein said score comprises an automation score and said community comprises a plurality of automated social media accounts.

14. The system of claim 13, wherein said automated social media accounts engage in a concerted effort to change sentiment about another social media account that is not a member of the community.

15. The system of claim 13 wherein said analyzing said interactions further comprises creating a map of interactions between members of the community.

16. The system of claim 15, wherein said map of interactions is determined as a graph, wherein said graph comprises a plurality of nodes, wherein said nodes represent members of the community and links between said nodes represent interactions between said members.

17. The system of claim 1, wherein said analyzing said interactions further comprises recursively analyzing a plurality of interacting social media accounts, to detect one or more suspect accounts that are suspected of belonging to the community; wherein members of the community are determined to interact with each other bidirectionally and with social media accounts outside of the community unidirectionally, such that said members of the community respond to social media accounts outside of the community but said social media accounts outside of the community fail to respond to said members of the community.

18. The system of claim 1, wherein said analyzing said interactions further comprises analyzing interactions of social media accounts with each other to classify said social media accounts as influencers, repeaters, authentic users, and spammers.

19. A system for detecting an interactive network of a plurality of automated accounts posting to a social media channel, wherein each automated account is operated by at least one social media account computational device, the system comprising: an ingestion computational device comprising a first memory for storing a plurality of first instructions and a first processor for executing said first instructions, wherein said first instructions include instructions for:
   connecting to the social media channel; and
   receiving a plurality of social media postings from a plurality of social media accounts;
the system further comprising an analysis computational device comprising a second memory for storing a plurality of second instructions and a second processor for executing said second instructions, wherein said second instructions include instructions for:
analyzing said social media postings according to interactions between said social media accounts;
wherein said analyzing said interactions is performed according to an algorithm selected from the group consisting of: page rank variations, Louvain community detection, K-core Decomposition for virality measurement, Triangle Count, Heuristic rules, Story-level features, Author features and Graph-level features; and
determining which of said posting entities are in a community according to said analyzing;
and a computer network for communication between said computational devices; wherein said ingestion engine obtains social media messages for a plurality of social media accounts, said ingestion computational device transmitting said social media messages to said analysis computational device; and wherein said analyzing said interactions further comprises recursively analyzing a plurality of interacting social media accounts, to detect one or more suspect accounts that are suspected of belonging to the community; wherein members of the community are determined to interact with each other bidirectionally and with social media accounts outside of the community unidirectionally, such that said members of the community respond to social media accounts outside of the community but said social media accounts outside of the community fail to respond to said members of the community.

20. The system of claim 19, wherein said automated social media accounts engage in a concerted effort to change sentiment about another social media account that is not a member of the community.

* * * * *